United States Patent
Chakraborty et al.

(10) Patent No.: US 12,546,498 B2
(45) Date of Patent: Feb. 10, 2026

(54) THERMOSTAT WITH EXTERNAL INTERRUPT

(71) Applicant: Johnson Controls Tyco IP Holdings LLP, Milwaukee, WI (US)

(72) Inventors: Sayan Chakraborty, Brookfield, WI (US); Aaron D. Wagner, Menomonee Falls, WI (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 326 days.

(21) Appl. No.: 18/104,162

(22) Filed: Jan. 31, 2023

(65) Prior Publication Data

US 2023/0250986 A1 Aug. 10, 2023

Related U.S. Application Data

(60) Provisional application No. 63/304,813, filed on Jan. 31, 2022.

(51) Int. Cl.
*F24F 11/63* (2018.01)
*F24F 11/37* (2018.01)

(52) U.S. Cl.
CPC .............. *F24F 11/63* (2018.01); *F24F 11/37* (2018.01)

(58) Field of Classification Search
CPC .. F24F 11/37; F24F 11/63; F24F 11/64; F24F 11/65; F24F 2110/10; F24F 1/00; F24F 5/00; F24F 6/00; F24F 7/00; F24F 11/00; F24F 2110/00; F24F 2203/00
See application file for complete search history.

(56) References Cited

U.S. PATENT DOCUMENTS

| | | | | |
|---|---|---|---|---|
| 5,995,350 | A * | 11/1999 | Kopelman | H02H 5/047 361/103 |
| 2008/0014857 | A1 | 1/2008 | Spadafora et al. | |
| 2011/0153090 | A1* | 6/2011 | Besore | G05B 15/02 700/278 |
| 2014/0365017 | A1 | 12/2014 | Hanna et al. | |
| 2015/0032264 | A1 | 1/2015 | Emmons et al. | |
| 2016/0209070 | A1 | 7/2016 | Hrejsa et al. | |
| 2017/0264091 | A1* | 9/2017 | Curry | H03K 17/0822 |
| 2017/0299215 | A1* | 10/2017 | Li | F24F 11/58 |
| 2019/0163213 | A1* | 5/2019 | Ostrye | F24F 11/65 |
| 2019/0226729 | A1* | 7/2019 | Valdez | F24F 11/89 |

(Continued)

FOREIGN PATENT DOCUMENTS

| | | |
|---|---|---|
| KR | 101618224 B1 | 5/2016 |
| WO | WO-2022/113382 A1 | 6/2022 |

*Primary Examiner* — Kidest Worku
(74) *Attorney, Agent, or Firm* — Foley & Lardner LLP

(57) ABSTRACT

A HVAC system includes building equipment operable to affect a physical state of a space in the building and a controller coupled to the building equipment. The controller is configured to accept a plurality of binary inputs indicating one or more conditions of the space, provide, to the building equipment, a plurality of outputs configured to control the operation of the building equipment, configure a first binary input of a plurality of binary inputs as an interrupt, the interrupt configured to receive an interrupt signal, determine, based on the interrupt signal, a state of the interrupt, and deactivate the plurality of outputs so that no control signals are sent to the building equipment so long as the controller determines the interrupt is in an activated state.

20 Claims, 12 Drawing Sheets

(56) References Cited

U.S. PATENT DOCUMENTS

| | | |
|---|---|---|
| 2019/0316795 A1* | 10/2019 | Hadzidedic .............. F24F 11/56 |
| 2019/0346170 A1 | 11/2019 | Benefield |
| 2020/0326088 A1 | 10/2020 | Mowris et al. |
| 2021/0200164 A1 | 7/2021 | Ploegert et al. |
| 2022/0146128 A1 | 5/2022 | Bassa et al. |
| 2022/0244686 A1 | 8/2022 | Rafiee et al. |
| 2023/0288770 A1 | 9/2023 | Gupta et al. |

* cited by examiner

THERMOSTAT WITH EXTERNAL INTERRUPT

CROSS-REFERENCE TO RELATED PATENT APPLICATIONS

This application claims priority to and the benefit of U.S. Provisional Application No. 63/304,813, filed Jan. 31, 2022, which is incorporated herein by reference in its entirety.

BACKGROUND

Heating, ventilating, or air conditioning (HVAC) systems for residential, industrial, and commercial buildings often include a controller, such as a thermostat, installed within the building to monitor temperature and provide control signals to HVAC equipment. The present invention relates generally to thermostats and more particularly to improved control of a building or a space through the use of a multi-function thermostat to maximize air quality and energy efficiency.

Traditional thermostats sense the temperature of a system and control components of the HVAC in order to maintain a setpoint. A thermostat may be designed to control a heating or cooling system or an air conditioner. Thermostats are manufactured in many ways, and use a variety of sensors to measure temperature and other desired parameters of a system.

Conventional thermostats are configured for one-way communication to connected components, and to control HVAC systems by turning on or off certain components or by regulating flow. Each thermostat may include a temperature sensor and a user interface. The user interface typically includes a display for presenting information to a user and one or more user interface elements for receiving input from a user. To control the temperature or other environmental parameters of a building or space, a user adjusts the space via the thermostat's user interface.

SUMMARY

Some embodiments of the present disclosure are related to a heating, ventilation, or air conditioning (HVAC) system in a building. The HVAC system includes building equipment operable to affect a physical state or condition of a space in the building and a controller coupled to the building equipment via a system bus. The controller includes a processing circuit comprising one or more memory devices coupled to one or more processors, the one or more memory devices configured to store instructions thereon that, when executed by the one or more processors, cause the one or more processors to accept a plurality of binary inputs indicating one or more conditions of the space, provide, to the building equipment, a plurality of outputs configured to control the operation of the building equipment, configure a first binary input of a plurality of binary inputs as an interrupt, the interrupt configured to receive an interrupt signal, determine, based on the interrupt signal, a state of the interrupt, and deactivate the plurality of outputs so that no control signals are sent to the building equipment so long as the controller determines the interrupt is in an activated state.

Another exemplary embodiment relates to a method for operating a heating, ventilation, or air conditioning (HVAC) system in a building. The method includes providing a controller comprising a processing circuit comprising one or more memory devices coupled to one or more processors, the one or more memory devices configured to store instructions thereon that, when executed by the one or more processors, cause the one or more processors to: accept a plurality of binary inputs indicating one or more conditions of the space, provide, to building equipment operable to affect a physical state or condition of the space, a plurality of outputs configured to control the operation of building equipment, configure a first binary input of a plurality of binary inputs as an interrupt, the interrupt configured to receive an interrupt signal, determine, based on the interrupt signal, a state of the interrupt, and deactivate the plurality of outputs so that no control signals are sent to the building equipment so long as the controller determines the interrupt is in an activated state.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

Referring generally to the FIGURES, a thermostat for use in a heating, ventilation, or air conditioning (HVAC) system is shown. The thermostat described herein may be used in any HVAC system, room, environment, or space within which it is desired to control and/or observe environmental conditions (e.g., temperature, humidity, $CO_2$ levels, etc.). A thermostat may be adjusted by a user to control the environment in the space.

The thermostat can also control the environment in a space to reduce pathogens that may be present in the space. The thermostat is intended to provide the user with the ability to exchange the air in a space with fresh air from outside the building. When ventilating a space the thermostat can take into account the environmental conditions in the space, its occupancy, and the environmental conditions outside of the space.

In some embodiments, the thermostat provides the user with an ability to function as a connected smart hub. The thermostat provides a desirable user interface for a smart hub with such environmental controls because of its known fixed location within a space and its ability to observe environmental conditions in the space.

The thermostat collects data about the space, its occupants, and the outdoor air with various sensors (e.g., temperature sensors, humidity sensors, acoustic sensors, optical sensors, gas and other chemical sensors, biometric sensors, motion sensors, etc.) and user inputs. The thermostat may utilize data collected from a single room, multiple rooms, an entire building, or multiple buildings, and in some cases receive data from other thermostat devices or supervisory devices. The data may be analyzed locally by the user control device or may be uploaded to a remote computing system and/or the cloud for further analysis and processing.

Building Management System and HVAC System

Figure 1:
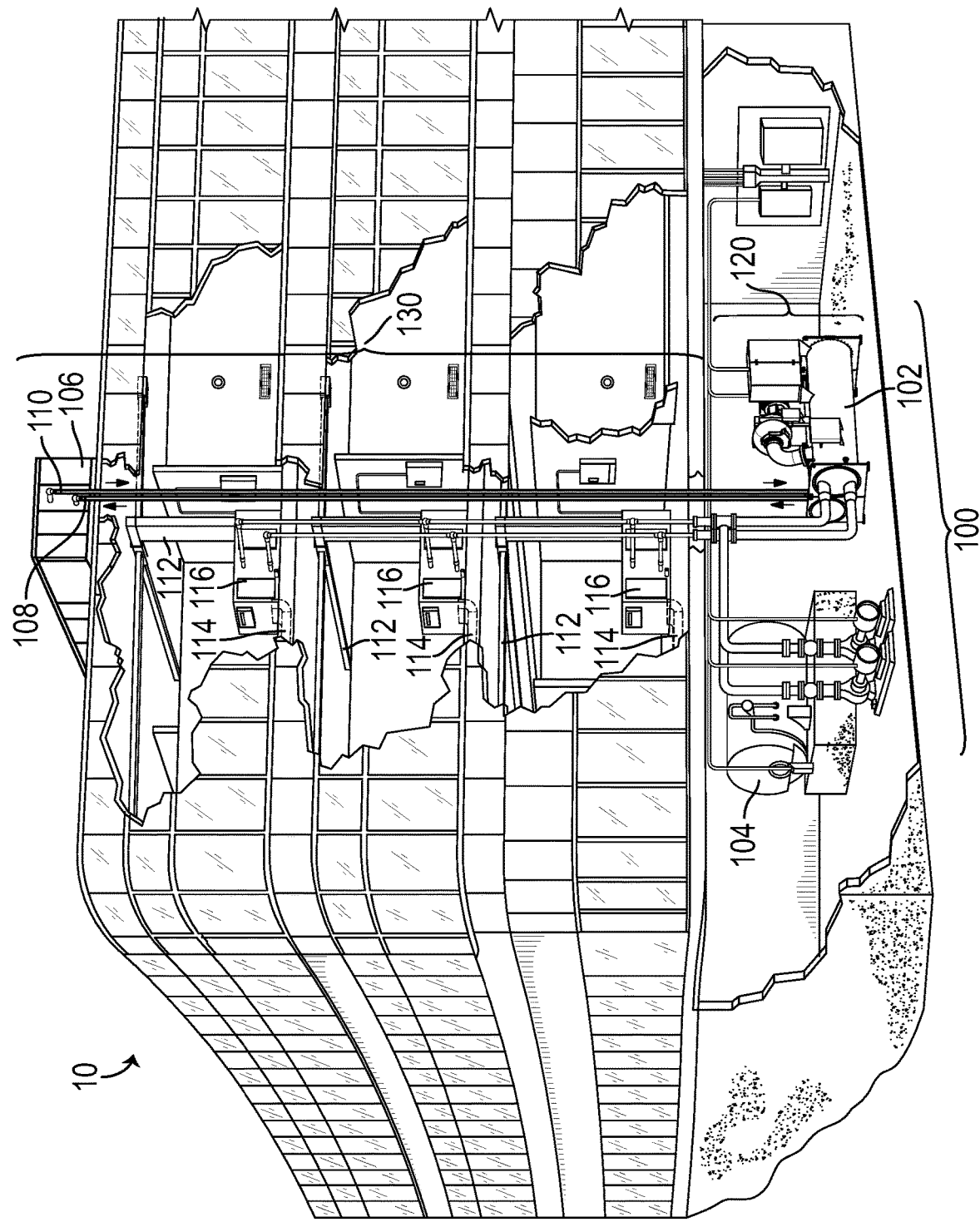
FIG. 1 is a schematic drawing of a building equipped with a HVAC system, according to an exemplary embodiment.

Referring now to FIGS. 1-4, an exemplary building management system (BMS) and HVAC system in which the systems and methods of the present disclosure may be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, and any other system that is capable of managing building functions or devices, or any combination thereof.

The BMS that serves building 10 includes an HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which may be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 may be located in or around building 10 (as shown in FIG. 1) or at an offsite location such as a central plant (e.g., a chiller plant, a steam plant, a heat plant, etc.). The working fluid may be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 may be transported to AHU 106 via piping 108.

AHU 106 may place the working fluid in a heat exchange relationship with an airflow passing through AHU 106 (e.g., via one or more stages of cooling coils and/or heating coils). The airflow may be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Figure 2:
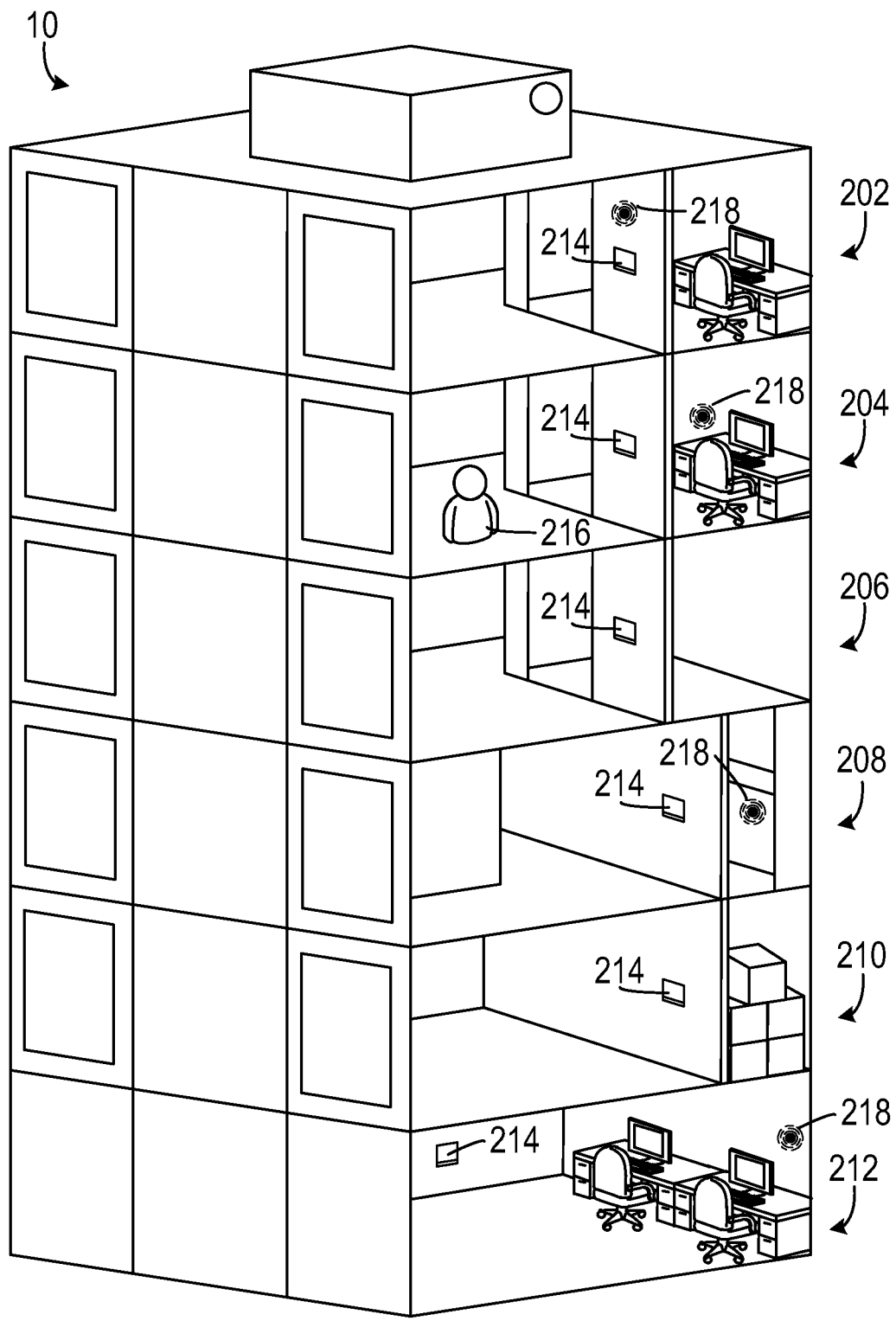
FIG. 2 is a schematic drawing of multiple zones and floors of the building of FIG. 1 equipped with control devices, according to an exemplary embodiment.

Referring now to FIG. 2, building 10 is shown in greater detail, according to an exemplary embodiment. Building 10 may have multiple zones. In FIG. 2, building 10 has zones, 202, 204, 206, 208, 210, and 212. In building 10, the zones each correspond to a separate floor. In various embodiments, the zones of building 10 may be rooms, sections of a floor, multiple floors, etc. Each zone may have a corresponding control device 214. In some embodiments, control device 214 is at least one of a thermostat, a sensor, a controller, a display device, a concierge device, a medical monitor device, etc. Control device 214 may take input from users. The input may be an environmental setpoint, a concierge question, a payment, etc. In some embodiments, control device 214 can cause music and/or building announcements to be played in one or more of zones 202-212, cause the temperature and/or humidity to be regulated in one or more of zones 202-212, and/or any other control action.

In some embodiments, control device 214 can monitor the health of an occupant 216 of building 10. In some embodiments, control device 214 monitors heat signatures, heart-rates, and any other information that can be collected from cameras, medical devices, and/or any other health related sensor. In some embodiments, building 10 has wireless transmitters 218 in each or some of zones 202-212. The wireless transmitters 218 may be routers, coordinators, and/or any other device broadcasting radio waves. In some embodiments, wireless transmitters 218 form a Wi-Fi network, a Zigbee network, a Bluetooth network, and/or any other kind of network.

In some embodiments, occupant 216 has a mobile device that can communicate with wireless transmitters 218. Control device 214 may use the signal strengths between the mobile device of occupant 216 and the wireless transmitters 218 to determine in which zone the occupant is. In some embodiments, control device 214 causes temperature setpoints, music and/or other control actions to follow occupant 216 as the occupant 216 moves from one zone to another zone (i.e., from one floor to another floor).

In some embodiments, control devices 214 are connected to a building management system, a weather server, and/or a building emergency sensor(s). In some embodiments, control devices 214 may receive emergency notifications from the building management system, the weather server, and/or the building emergency sensor(s). Based on the nature of the emergency, control devices 214 may give directions to an occupant of the building. In some embodiments, the direction may be to respond to an emergency (e.g., call the police, hide and turn the lights off, etc.) In various embodiments, the directions given to the occupant (e.g., occupant 216) may be navigation directions. For example, zone 212 may be a safe zone with no windows an individual (e.g., occupant 216). If control devices 214 determines that there are high winds around building 10, the control device 214 may direct occupants of zones 202-210 to zone 212 if zone 212 has no windows.

Figure 3:
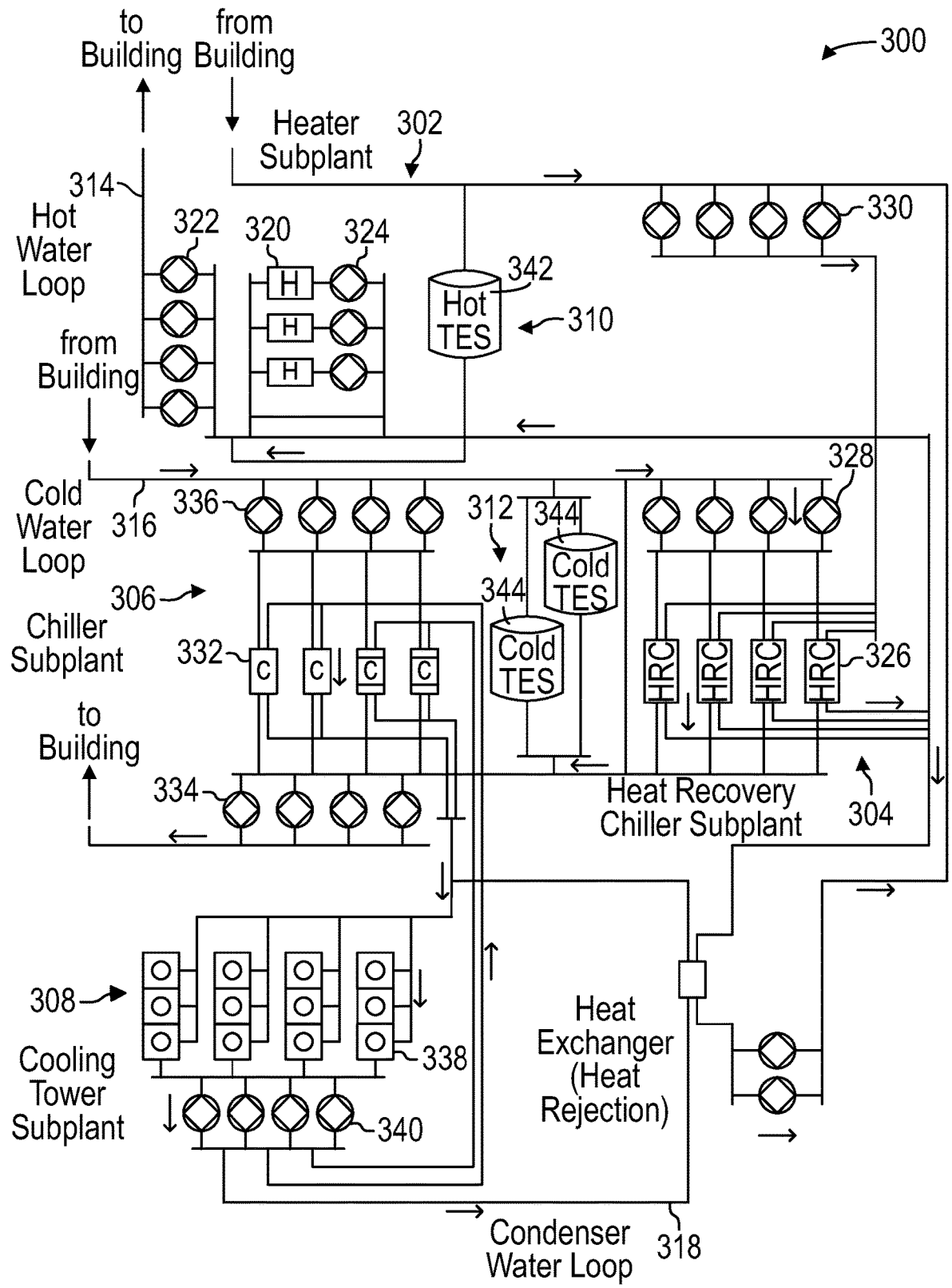
FIG. 3 is a schematic block diagram of a waterside system that may be used in conjunction with the building of FIGS. 1-2, according to an exemplary embodiment.

Referring now to FIG. 3, a block diagram of a waterside system 300 is shown, according to an exemplary embodiment. In various embodiments, waterside system 300 may supplement or replace waterside system 120 in HVAC system 100 or may be implemented separate from HVAC system 100. When implemented in HVAC system 100, waterside system 300 may include a subset of the HVAC devices in HVAC system 100 (e.g., boiler 104, chiller 102, pumps, valves, etc.) and may operate to supply a heated or chilled fluid to AHU 106. The HVAC devices of waterside system 300 may be located within building 10 (e.g., as components of waterside system 120) or at an offsite location such as a central plant.

In FIG. 3, waterside system 300 is shown as a central plant having a plurality of subplants 302-312. Subplants 302-312 are shown to include a heater subplant 302, a heat recovery chiller subplant 304, a chiller subplant 306, a cooling tower subplant 308, a hot thermal energy storage (TES) subplant 310, and a cold thermal energy storage (TES) subplant 312. Subplants 302-312 consume resources (e.g., water, natural gas, electricity, etc.) from utilities to serve the thermal energy loads (e.g., hot water, cold water, heating, cooling, etc.) of a building or campus. For example, heater subplant 302 may be configured to heat water in a hot water loop 314 that circulates the hot water between heater subplant 302 and building 10. Chiller subplant 306 may be configured to chill water in a cold water loop 316 that circulates the cold water between chiller subplant 306 building 10. Heat recovery chiller subplant 304 may be configured to transfer heat from cold water loop 316 to hot water loop 314 to provide additional heating for the hot water and additional cooling for the cold water. Condenser water loop 318 may absorb heat from the cold water in chiller subplant 306 and reject the absorbed heat in cooling tower subplant 308 or transfer the absorbed heat to hot water loop 314. Hot TES subplant 310 and cold TES subplant 312 may store hot and cold thermal energy, respectively, for subsequent use.

Hot water loop 314 and cold water loop 316 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 302-312 to receive further heating or cooling.

Although subplants 302-312 are shown and described as heating and cooling water for circulation to a building, it is understood that any other type of working fluid (e.g., glycol, $CO_2$, etc.) may be used in place of or in addition to water to serve the thermal energy loads. In other embodiments, subplants 302-312 may provide heating and/or cooling directly to the building or campus without requiring an intermediate heat transfer fluid. These and other variations to waterside system 300 are within the teachings of the present disclosure.

Each of subplants 302-312 may include a variety of equipment configured to facilitate the functions of the subplant. For example, heater subplant 302 is shown to include a plurality of heating elements 320 (e.g., boilers, electric heaters, etc.) configured to add heat to the hot water in hot water loop 314. Heater subplant 302 is also shown to include several pumps 322 and 324 configured to circulate the hot water in hot water loop 314 and to control the flow rate of the hot water through individual heating elements 320. Chiller subplant 306 is shown to include a plurality of chillers 332 configured to remove heat from the cold water in cold water loop 316. Chiller subplant 306 is also shown to include several pumps 334 and 336 configured to circulate the cold water in cold water loop 316 and to control the flow rate of the cold water through individual chillers 332.

Heat recovery chiller subplant 304 is shown to include a plurality of heat recovery heat exchangers 326 (e.g., refrigeration circuits) configured to transfer heat from cold water loop 316 to hot water loop 314. Heat recovery chiller subplant 304 is also shown to include several pumps 328 and 330 configured to circulate the hot water and/or cold water through heat recovery heat exchangers 326 and to control the flow rate of the water through individual heat recovery heat exchangers 226. Cooling tower subplant 308 is shown to include a plurality of cooling towers 338 configured to remove heat from the condenser water in condenser water loop 318. Cooling tower subplant 308 is also shown to include several pumps 340 configured to circulate the condenser water in condenser water loop 318 and to control the flow rate of the condenser water through individual cooling towers 338.

Hot TES subplant 310 is shown to include a hot TES tank 342 configured to store the hot water for later use. Hot TES subplant 310 may also include one or more pumps or valves configured to control the flow rate of the hot water into or out of hot TES tank 342. Cold TES subplant 312 is shown to include cold TES tanks 344 configured to store the cold water for later use. Cold TES subplant 312 may also include one or more pumps or valves configured to control the flow rate of the cold water into or out of cold TES tanks 344.

In some embodiments, one or more of the pumps in waterside system 300 (e.g., pumps 322, 324, 328, 330, 334, 336, and/or 340) or pipelines in waterside system 300 include an isolation valve associated therewith. Isolation valves may be integrated with the pumps or positioned upstream or downstream of the pumps to control the fluid flows in waterside system 300. In various embodiments, waterside system 300 may include more, fewer, or different types of devices and/or subplants based on the particular configuration of waterside system 300 and the types of loads served by waterside system 300.

Figure 4:
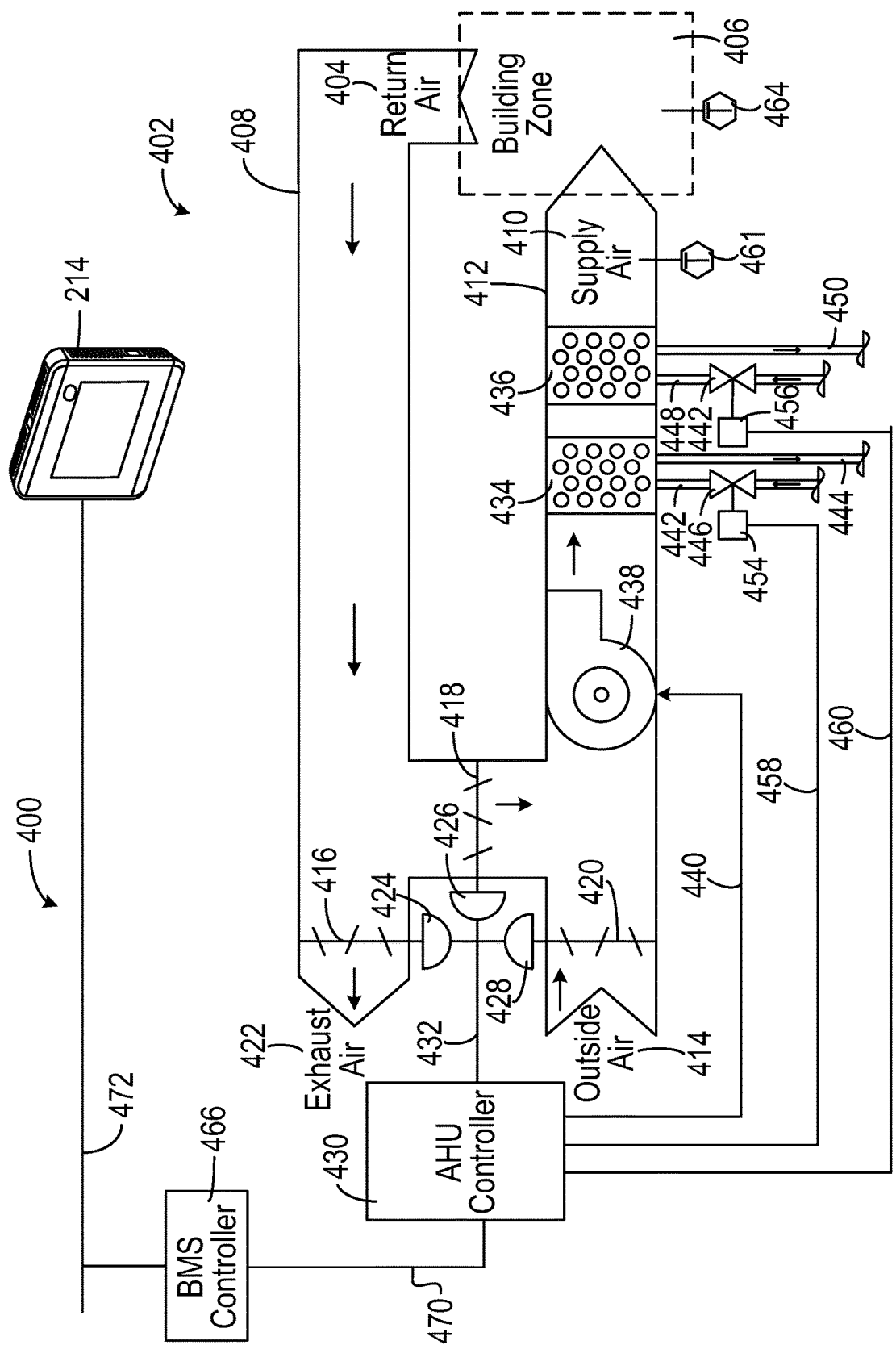
FIG. 4 is a schematic block diagram of an airside system that may be used in conjunction with the building of FIGS. 1-2, according to an exemplary embodiment.

Referring now to FIG. 4, airside system 400 is shown to include an economizer-type air handling unit (AHU) 402. Economizer-type AHUs vary the amount of outside air and return air used by the air handling unit for heating or cooling. For example, AHU 402 may receive return air 404 from building zone 406 via return air duct 408 and may deliver supply air 410 to building zone 406 via supply air duct 412. In some embodiments, AHU 402 is a rooftop unit located on the roof of building 10 (e.g., AHU 402 as shown in FIG. 1) or otherwise positioned to receive both return air 404 and outside air 414. AHU 402 may be configured to operate exhaust air damper 416, mixing damper 418, and outside air damper 420 to control an amount of outside air 414 and return air 404 that combine to form supply air 410. Any return air 404 that does not pass through mixing damper 418 may be exhausted from AHU 402 through exhaust damper 416 as exhaust air 422.

Each of dampers 416-420 may be operated by an actuator. For example, exhaust air damper 416 may be operated by actuator 424, mixing damper 418 may be operated by actuator 426, and outside air damper 420 may be operated by actuator 428. Actuators 424-428 may communicate with an AHU controller 430 via a communications link 432. Actuators 424-428 may receive control signals from AHU controller 430 and may provide feedback signals to AHU controller 430. Feedback signals may include, for example, an indication of a current actuator or damper position, an amount of torque or force exerted by the actuator, diagnostic information (e.g., results of diagnostic tests performed by actuators 424-428), status information, commissioning information, configuration settings, calibration data, and/or other types of information or data that may be collected, stored, or used by actuators 424-428. AHU controller 430 may be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 424-428.

Still referring to FIG. 4, AHU 402 is shown to include a cooling coil 434, a heating coil 436, and a fan 438 positioned within supply air duct 412. Fan 438 may be configured to force supply air 410 through cooling coil 434 and/or heating coil 436 and provide supply air 410 to building zone 406. AHU controller 430 may communicate with fan 438 via communications link 440 to control a flow rate of supply air 410. In some embodiments, AHU controller 430 controls an amount of heating or cooling applied to supply air 410 by modulating a speed of fan 438.

Cooling coil 434 may receive a chilled fluid from waterside system 200 (e.g., from cold water loop 316) via piping 442 and may return the chilled fluid to waterside system 200 via piping 444. Valve 446 may be positioned along piping 442 or piping 444 to control a flow rate of the chilled fluid through cooling coil 474. In some embodiments, cooling coil 434 includes multiple stages of cooling coils that can be independently activated and deactivated (e.g., by AHU controller 430, by BMS controller 466, etc.) to modulate an amount of cooling applied to supply air 410.

Heating coil 436 may receive a heated fluid from waterside system 200 (e.g., from hot water loop 314) via piping 448 and may return the heated fluid to waterside system 200 via piping 450. Valve 452 may be positioned along piping 448 or piping 450 to control a flow rate of the heated fluid through heating coil 436. In some embodiments, heating coil 436 includes multiple stages of heating coils that can be independently activated and deactivated (e.g., by AHU controller 430, by BMS controller 466, etc.) to modulate an amount of heating applied to supply air 410.

Each of valves 446 and 452 may be controlled by an actuator. For example, valve 446 may be controlled by actuator 454 and valve 452 may be controlled by actuator 456. Actuators 454-456 may communicate with AHU controller 430 via communications links 458-460. Actuators 454-456 may receive control signals from AHU controller 430 and may provide feedback signals to controller 430. In some embodiments, AHU controller 430 receives a measurement of the supply air temperature from a temperature sensor 462 positioned in supply air duct 412 (e.g., downstream of cooling coil 434 and/or heating coil 436). AHU controller 430 may also receive a measurement of the temperature of building zone 406 from a temperature sensor 464 located in building zone 406.

In some embodiments, AHU controller 430 operates valves 446 and 452 via actuators 454-456 to modulate an amount of heating or cooling provided to supply air 410 (e.g., to achieve a set point temperature for supply air 410 or to maintain the temperature of supply air 410 within a set point temperature range). The positions of valves 446 and 452 affect the amount of heating or cooling provided to supply air 410 by cooling coil 434 or heating coil 436 and may correlate with the amount of energy consumed to achieve a desired supply air temperature. AHU controller 430 may control the temperature of supply air 410 and/or building zone 406 by activating or deactivating coils 434-436, adjusting a speed of fan 438, or a combination of both.

Still referring to FIG. 4, airside system 400 is shown to include a building management system (BMS) controller 466 and a control device 214. BMS controller 466 may include one or more computer systems (e.g., servers, supervisory controllers, subsystem controllers, etc.) that serve as system level controllers, application or data servers, head nodes, or master controllers for airside system 400, waterside system 200, HVAC system 100, and/or other controllable systems that serve building 10. BMS controller 466 may communicate with multiple downstream building systems or subsystems (e.g., HVAC system 100, a security system, a lighting system, waterside system 200, etc.) via a communications link 470 according to like or disparate protocols (e.g., LON, BACnet, etc.). In various embodiments, AHU controller 430 and BMS controller 466 may be separate (as shown in FIG. 4) or integrated. In an integrated implementation, AHU controller 430 may be a software module configured for execution by a processor of BMS controller 466.

In some embodiments, AHU controller 430 receives information from BMS controller 466 (e.g., commands, set points, operating boundaries, etc.) and provides information to BMS controller 466 (e.g., temperature measurements, valve or actuator positions, operating statuses, diagnostics, etc.). For example, AHU controller 430 may provide BMS controller 466 with temperature measurements from temperature sensors 462-464, equipment on/off states, equipment operating capacities, and/or any other information that can be used by BMS controller 466 to monitor or control a variable state or condition within building zone 406.

Control device 214 may include one or more of the user control devices. Control device 214 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Control device 214 may be a computer workstation, a client terminal, a remote or local interface, or any other type of user interface device. Control device 214 may be a stationary terminal or a mobile device. For example, control device 214 may be a desktop computer, a computer server with a user interface, a laptop computer, a tablet, a smartphone, a PDA, or any other type of mobile or non-mobile device. Control device 214 may communicate with BMS controller 466 and/or AHU controller 430 via communications link 472. In some embodiments, control device 214 communicates directly with AHU controller 430, bypassing BMS controller 466.

Figure 5:
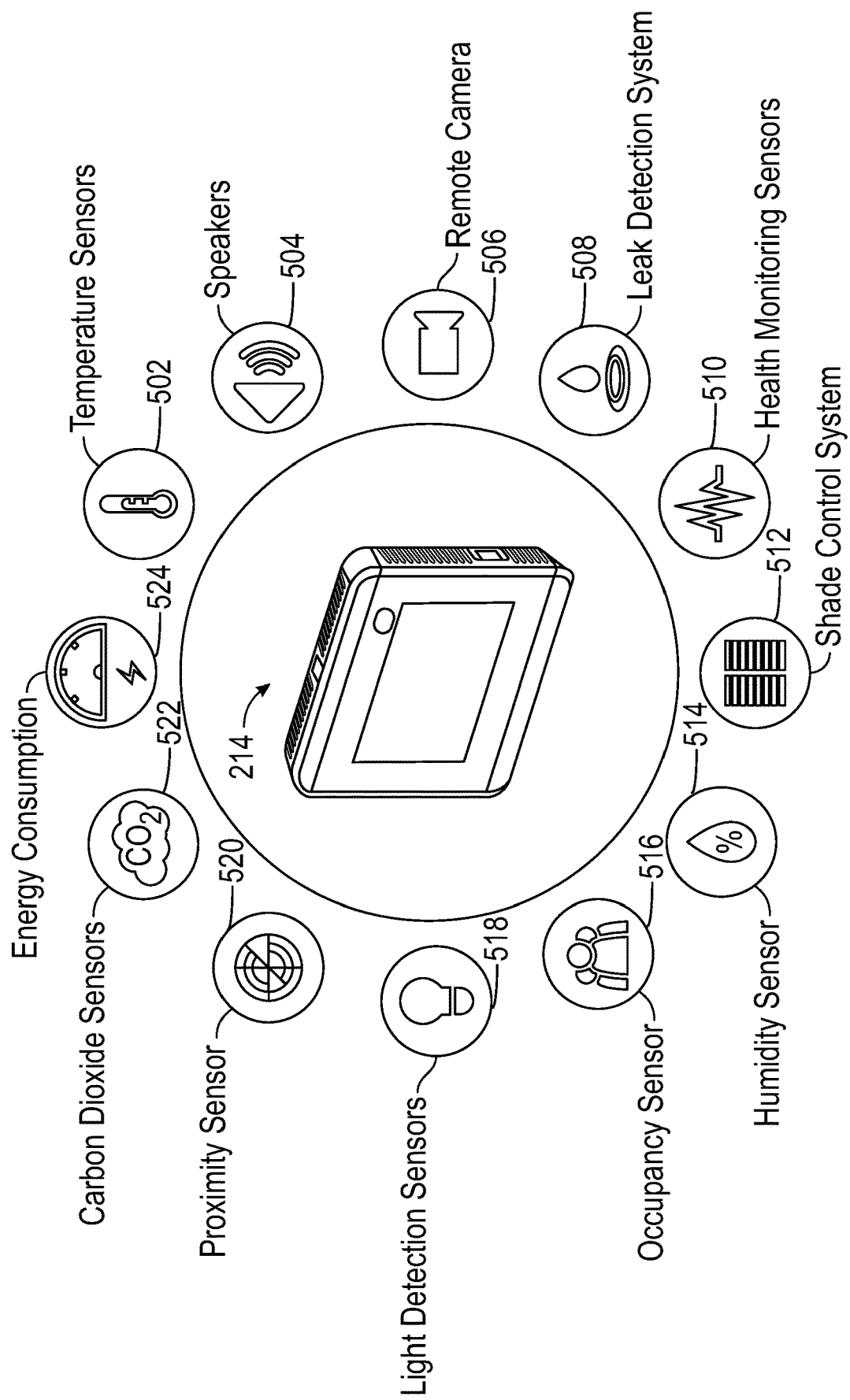
FIG. 5 is a schematic drawing of the connections of the control device of FIG. 2 and FIG. 4, according to an exemplary embodiment.

Referring now to FIG. 5, control device 214 is shown as a connected smart hub or private area network (PAN), according to some embodiments. Control device 214 may include a variety of sensors and may be configured to communicate with a variety of external systems or devices. For example, control device 214 may include temperature sensors 502, speakers 504, leak detection system 508, health monitoring sensors 510, humidity sensors 514, occupancy sensors 516, light detection sensors 518, proximity sensor 520, carbon dioxide sensors 522, or any of a variety of other sensors. Alternatively, control device 214 may receive input from external sensors configured to measure such variables. The external sensors may not communicate over a PAN network but may communicate with control device 214 via an IP based network and/or the Internet.

In some embodiments, speakers 504 are located locally as a component of control device 214. Speakers 504 may be low power speakers used for playing audio to the immediate occupant of control device 214 and/or occupants of the zone in which control device 214 is located. In some embodiments, speakers 504 may be remote speakers connected to control device 214 via a network. In some embodiments, speakers 504 are a building audio system, an emergency alert system, and/or alarm system configured to broadcast building wide and/or zone messages or alarms.

Control device 214 may communicate with a remote camera 506, a shade control system 512, a leak detection system 508, a HVAC system, or any of a variety of other external systems or devices which may be used in a home automation system or a building automation system. Control device 214 may provide a variety of monitoring and control interfaces to allow a user to control all of the systems and devices connected to control device 214. Exemplary user interfaces and features of control device 214 are described in greater detail below.

Figure 6:
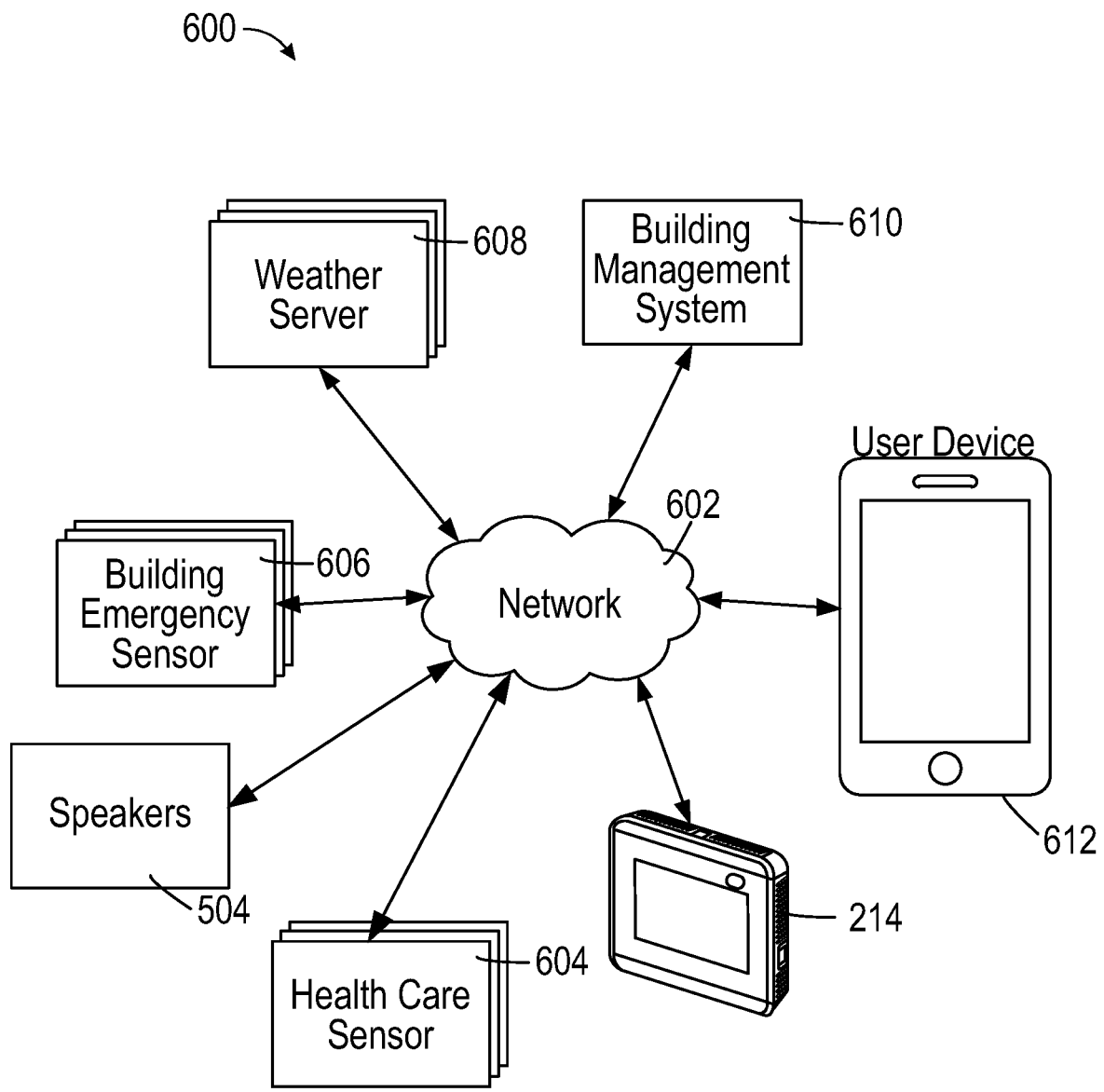
FIG. 6 is a schematic diagram of a communications system located in the building of FIGS. 1 and 2, according to an exemplary embodiment.

Referring now to FIG. 6, a block diagram of communications system 600 is shown, according to an exemplary embodiment. System 600 can be implemented in a building (e.g. building 10) and is shown to include control device 214, network 602, healthcare sensor(s) 604, building emergency sensor(s) 606, weather server(s) 608, building management system 610, and user device 612. System 600 connects devices, systems, and servers via network 602 so that building information, HVAC controls, emergency information, navigation directions, and other information can be passed between devices (e.g., control device 214, user device 612, and/or building emergency sensor(s) 606 and servers and systems (e.g., weather server(s) 608 and/or building management system 610). In some embodiments, control device 214 is connected to speakers 504 as described with reference to FIG. 5.

In some embodiments, network 602 communicatively couples the devices, systems, and servers of system 600. In some embodiments, network 602 is at least one of and/or a combination of a Wi-Fi network, a wired Ethernet network, a ZigBee network, and a Bluetooth network. Network 602 may be a local area network or a wide area network (e.g., the Internet, a building WAN, etc.) and may use a variety of communications protocols (e.g., BACnet, IP, LON, etc.) Network 602 may include routers, modems, and/or network switches. The devices in system 600 including the control device 214 can include a software interface such as Open Blue Bridge live connection between the physical and digital replicas, enabling data exchange for seamless communication and action. The software interface can be executed on processing platform on the edge device (e.g., control device 214) and provide digital twinning on the control device for control device 214 and other sensors or equipment in system 600. The software interface also allows artificial intelligence (AI) application to be executed in the edge device and perform data analytics. Data analytics and a software interface are discussed in U.S. application Ser. No. 17/134,691, filed Dec. 28, 2020, incorporated herein by reference in its entirety and assigned to the assignee of the present application.

In some embodiments, control device 214 is configured to receive emergency information, navigation directions, occupant information, concierge information, and any other information via network 602. In some embodiments, the information is received from building management system 610 via network 602. In various embodiments, the information is received from the Internet via network 602. In some embodiments, control device 214 is at least one of or a combination of a thermostat, a humidistat, a light controller, and any other wall mounted and/or hand held device. In some embodiments, control device 214 is connected to building emergency sensor(s) 606. In some embodiments, building emergency sensor(s) 606 are sensors which detect building emergencies. Building emergency sensor(s) 606 may be smoke detectors, carbon monoxide detectors, carbon dioxide detectors (e.g., carbon dioxide sensors 522), an emergency button (e.g., emergency pull handles, panic buttons, a manual fire alarm button and/or handle, etc.) and/or any other emergency sensor. In some embodiments, the emergency sensor(s) include actuators. The actuators may be building emergency sirens and/or building audio speaker systems (e.g., speakers 504), automatic door and/or window control (e.g., shade control system 512), and any other actuator used in a building.

In some embodiments, control device 214 may be communicatively coupled to weather server(s) 608 via network 602. In some embodiments, the control device 214 may be configured to receive weather alerts (e.g., high and low daily temperature, five-day forecast, thirty-day forecast, etc.) from weather server(s) 608. Control device 214 may be configured to receive emergency weather alerts (e.g., flood warnings, fire warnings, thunder storm warnings, winter storm warnings, etc.) In some embodiments, control device 214 may be configured to display emergency warnings via a user interface of control device 214 when control device 214 receives an emergency weather alert from weather server(s) 608. The control device 214 may be configured to display emergency warnings based on the data received from building emergency sensor(s) 606. In some embodiments, the control device 214 may cause a siren (e.g., speakers 504 and/or building emergency sensor(s) 606) to alert occupants of the building of an emergency, cause all doors to become locked and/or unlocked, cause an advisory message be broadcast through the building, and control any other actuator or system necessary for responding to a building emergency.

In some embodiments, control device 214 is configured to communicate with building management system 610 via network 602. Control device 214 may be configured to transmit environmental setpoints (e.g., temperature setpoint, humidity setpoint, etc.) to building management system 610. In some embodiments, building management system 610 may be configured to cause zones of a building (e.g., building 10) to be controlled to the setpoint received from control device 214. In some embodiments, building management system 610 may be configured to control the lighting of a building. In some embodiments, building management system 610 may be configured to transmit emergency information to control device 214. In some embodiments, the emergency information is a notification of a shooter lockdown, a tornado warning, a flood warning, a thunderstorm warning, and/or any other warning. In some embodiments, building management system 610 is connected to various weather servers or other web servers from which building management system 610 receives emergency warning information. In various embodiments, building management system is a computing system of a hotel. Building management system 610 may keep track of hotel occupancy, may relay requests to hotel staff, and/or perform any other functions of a hotel computing system.

Control device 214 can be configured to communicate with user device 612 via network 602. In some embodiments, user device 612 is a smartphone, a tablet, a laptop computer, and/or any other mobile and/or stationary computing device. In some embodiments, user device 612 communicates calendar information to control device 214. In some embodiments, the calendar information is stored and/or entered by a user into a calendar application. In some embodiments, calendar application is at least one of Outlook, Google Calendar, Fantastical, Shifts, CloudCal, DigiCal, and/or any other calendar application. In some embodiments, control device 214 receives calendar information from the calendar application such as times and locations of appointments, times and locations of meetings, and/or any other information. Control device 214 may be configured to display building map direction to a user associated with user device 612 and/or any other information.

In some embodiments, a user may press a button on a user interface of control device 214 indicating a building emergency. The user may be able to indicate the type of emergency (e.g., fire, flood, active shooter, etc.) Control device 214 may communicate an alert to building management system 610, user device 612, and any other device, system, and/or server.

In some embodiments, control device 214 is communicably coupled to healthcare sensor(s) 604 via network 602. In some embodiments, control device 214 is configured to monitor healthcare sensor(s) 604 collecting data for occupants of a building (e.g., building 10) and determine health metrics for the occupants based on the data received from the healthcare sensor(s) 604. In some embodiments, healthcare sensor(s) 604 are one or more smart wrist bands, pacemakers, insulin pumps, and/or any other medical device. The health metrics may be determined based on heart rates, insulin levels, and/or any other biological and/or medical data.

In some embodiments, user device 612 is configured to provide one or templates for storage on control device 214. The templates define icons and locations as well as location for text information on control device. The templates are created in application software for the user device 612 (e.g., a mobile device, cell phone, etc.). In some embodiments, backgrounds for each templates can be selected. Templates include logo templates including customer or supplier logos and non-logo templates. Templates can be selected for specific buildings, rooms, environments (e.g., hospital, store, hotel, home, etc.) Some templates may be created for visually impaired or for different languages. Some templates may be for carbon emission/footprint monitoring, measuring, scoring (e.g. versus others, standards, or targets), and include icons dedicated to these applications (e.g., a green leaf having a size indicating green compliance, air quality warnings and icons indicating air quality, sustainability icons and settings, etc.).

Figure 7:
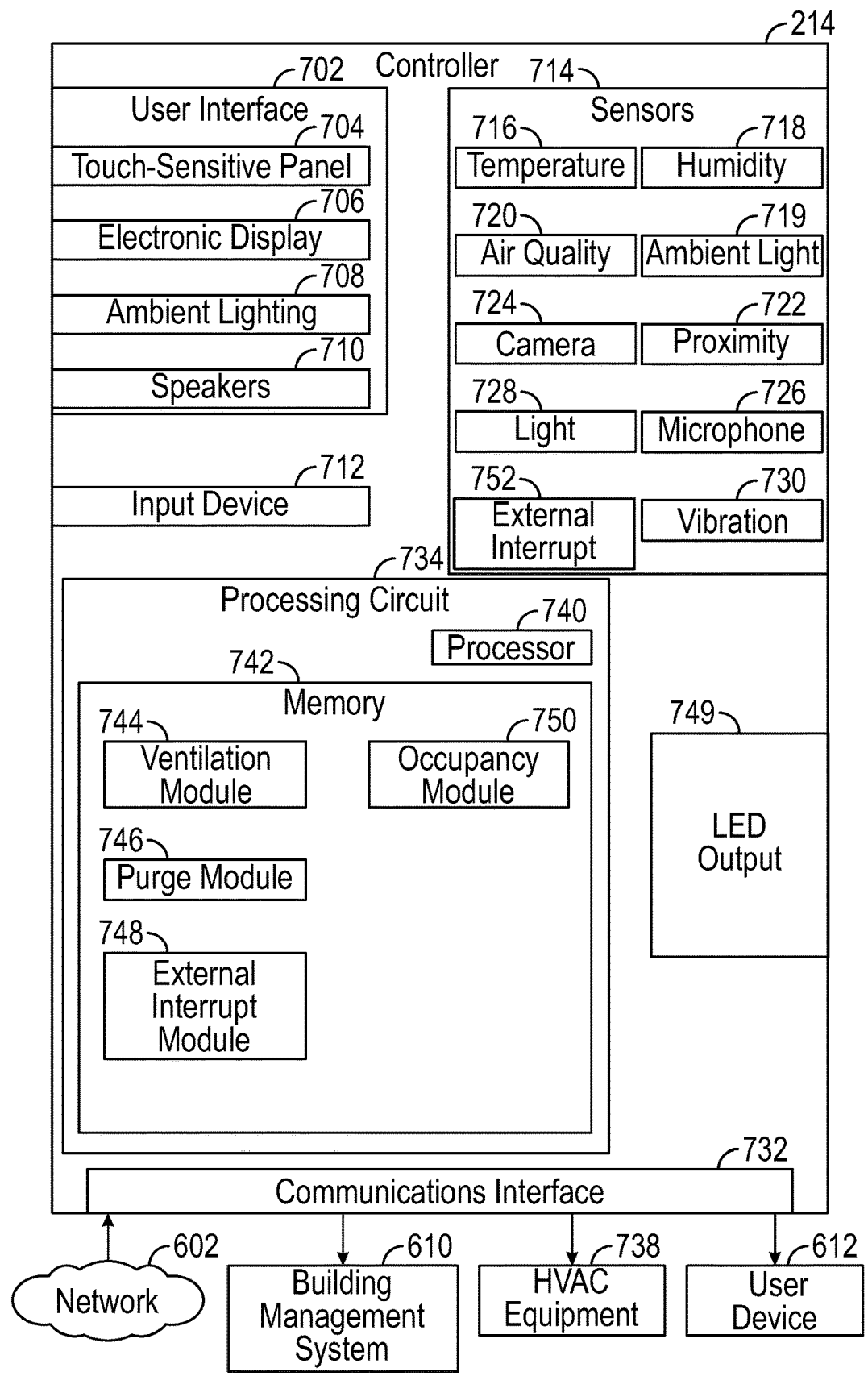
FIG. 7 is a schematic block diagram illustrating the control device of FIGS. 2, 4, 5, and 6 in greater detail, according to an exemplary embodiment.

Referring now to FIG. 7, a block diagram illustrating control device 214 in greater detail is shown, according to some embodiments. Control device 214 is shown to include a variety of user interfaces 702 and sensors 714 and is embodied as a commercial or residential thermostat. User interfaces 702 may be configured to receive input from a user and provide output to a user in various forms. For example, user interfaces 702 are shown to include touch-sensitive panel 704, electronic display 706 (e.g., pixelated display), ambient lighting 708, speakers 710 (e.g., speakers 504), and input device 712. In some embodiments, user interfaces 702 include a microphone configured to receive voice commands from a user, a keyboard or buttons, switches, dials, or any other user-operable input devices. It is contemplated that user interfaces 702 may include any type of device configured to receive input from a user and/or provide an output to a user in any of a variety of forms (e.g., touch, text, video, graphics, audio, vibration, etc.).

Sensors 714 may be configured to measure a variable state or condition of the environment in which control device 214 is installed. For example, sensors 714 are shown to include a temperature sensor 716, a humidity sensor 718, an ambient light sensor 719, an air quality sensor 720, a proximity sensor 722, a camera 724, a microphone 726, a light sensor 728, and a vibration sensor 730. In some embodiments, one or more of sensors 714 is not provided (e.g., microphone 726 and camera 724). Air quality sensor 720 may be configured to measure any of a variety of air quality variables such as oxygen level, carbon dioxide ($CO_2$) level, carbon monoxide level, allergens, pollutants, smoke, etc. Proximity sensor 722 may include one or more sensors configured to detect the presence of people or devices proximate to control device 214. For example, proximity sensor 722 may include a near-field communications (NFC) sensor, a radio frequency identification (RFID) sensor, a Bluetooth sensor, a capacitive proximity sensor, a biometric sensor, an infrared sensor, or any other sensor configured to detect the presence of a person or device. Camera 724 may include a visible light camera, a motion detector camera, an infrared camera, an ultraviolet camera, an optical sensor, or any other type of camera. Light sensor 728 may be configured to measure ambient light levels. Vibration sensor 730 may be configured to measure vibrations from earthquakes or other seismic activity at the location of control device 214.

Still referring to FIG. 7, control device 214 is shown to include a communications interface 732 and a processing circuit 734. Communications interface 732 may include wired or wireless interfaces (e.g., jacks, antennas, transmitters, receivers, transceivers, wire terminals, etc.) for conducting data communications with various systems, devices, or networks. For example, communications interface 732 may include an Ethernet card and port for sending and receiving data via an Ethernet-based communications network and/or a Wi-Fi transceiver for communicating via a wireless communications network. Communications interface 732 may be configured to communicate via local area networks or wide area networks (e.g., the Internet, a building WAN, etc.) and may use a variety of communications protocols (e.g., BACnet, IP, LON, etc.).

Communications interface 732 may include a network interface configured to facilitate electronic data communications between control device 214 and various external systems or devices (e.g., network 602, building management system 610, HVAC equipment 738, user device 612, etc.) For example, control device 214 may receive information from building management system 610 or HVAC equipment 738 indicating one or more measured states of the controlled building (e.g., temperature, humidity, electric loads, etc.) and one or more states of the HVAC equipment 738 (e.g., equipment status, power consumption, equipment availability, etc.). In some embodiments, HVAC equipment 738 may be lighting systems, building systems, actuators, chillers, heaters, and/or any other building equipment and/or system. The communication interface 732 between HVAC equipment 738 is a three wire (power, ground a communication) or four wire (power, communication 1, communication 2, and ground, B, G, Y, R or W or O/B, C, K, R) connection in some embodiments. Communications interface 732 may receive inputs from building management system 610 or HVAC equipment 738 and may provide operating parameters (e.g., on/off decisions, set points, etc.) to building management system 610 or HVAC equipment 738. The operating parameters may cause building management system 610 to activate, deactivate, or adjust a set point for various types of home equipment or building equipment in communication with control device 214.

Processing circuit 734 is shown to include a processor 740 and memory 742. Processor 740 may be a general purpose or specific purpose processor, an application specific integrated circuit (ASIC), one or more field programmable gate arrays (FPGAs), a group of processing components, or other suitable processing components. Processor 740 may be configured to execute computer code or instructions stored in memory 742 or received from other computer readable media (e.g., CDROM, network storage, a remote server, etc.). Processing circuit 734 adjusts the brightness of the electronic display 706 based upon ambient light sensed by ambient light sensor 719 or weather information received via network 602.

Memory 742 may include one or more devices (e.g., memory units, memory devices, storage devices, etc.) for storing data and/or computer code for completing and/or facilitating the various processes described in the present disclosure. Memory 742 may include random access memory (RAM), read-only memory (ROM), hard drive storage, temporary storage, non-volatile memory, flash memory, optical memory, or any other suitable memory for storing software objects and/or computer instructions. As used herein, memory excludes any transitory signals. Memory 742 may include database components, object code components, script components, or any other type of information structure for supporting the various activities and information structures described in the present disclosure. Memory 742 may be communicably connected to processor 740 via processing circuit 734 and may include computer code for executing (e.g., by processor 740) one or more processes described herein. For example, memory 742 includes a ventilation module 744, a purge module 746, an external interrupt module 748, and an occupancy module 750. The operation of some of these modules is described in greater detail below.

In some embodiments, ventilation module 744, purge module 746, and external interrupt module 748 are user configurable, for example at the control device 214 itself. When connected to a BMS (e.g., via BMS controller 466), a user of the BMS may also configure ventilation module 744, purge module 746, and external interrupt module 748 remotely via BMS interface. In some embodiments, a user may configure one or more modules via an app on a mobile device (e.g., user device 612 of FIG. 6).

LED module 748 controls light output 749 (e.g., LED output) to provide a light associated with an operating mode (idle, heat, cool, or emergency). The light output 749 can provide a color, flash, strobe in pattern, etc. to indicate a condition. For example, a red color can indicate a heat mode, a blue color can indicate a cool mode, a flashing orange can indicate an emergency or fault, and white or yellow can indicate an idle mode. Based on message received from the network or internal logic, user can configure the color of the light output 749 (e.g., one or more LEDs) and flashing pattern. For example, when it is a time to replace a filter, the light output 749 turns Yellow and flashes at constant or configurable interval or if there is a message from the facility manager to control device 214 and the message is not read yet, the light output 749 turns cyan.

The light output 749 includes one or more color light emitting diodes in some embodiments. Processing circuit 734 also controls display brightness in response to signals from ambient light sensor 719, time of day/season and/or weather information received from network 602.

Figure 8:
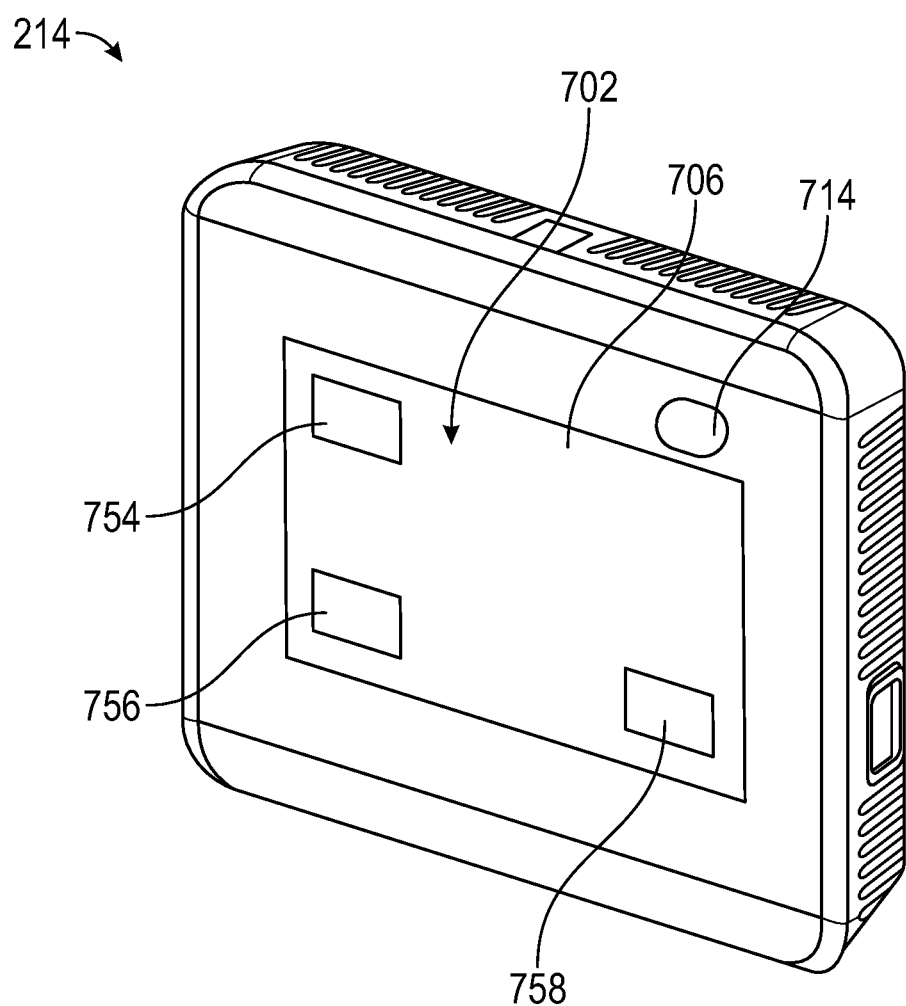
FIG. 8 is a perspective drawing of the control device of FIGS. 2, 4, 5, 6, and 7, according to an exemplary embodiment.

Referring now to FIG. 8, a perspective view schematic of the control device 214 of FIG. 7 is shown, according to an exemplary embodiment. The control device 214 includes one or more sensors 714 (e.g., humidity 718, proximity 722, etc.) on an upper right corner of the face of the control device 214. Additional sensors may be included inside the control device 214 and/or positioned at other locations. The user interface 702 includes an electronic display 706 (which may itself include or be positioned behind a touch-sensitive panel 704, not shown). In various embodiments, the control device 214 provides visual indicia of the operating modes, the setpoints, and the indoor or outdoor temperature, the $CO_2$ value, and the position of the damper on the user interface 702. For example, the user interface 702 may display the $CO_2$ value of the space, the damper position, and/or notifications is presented to a user of control device 214 in display areas 754, 756, and 758.

Air Quality Control

Figure 9:
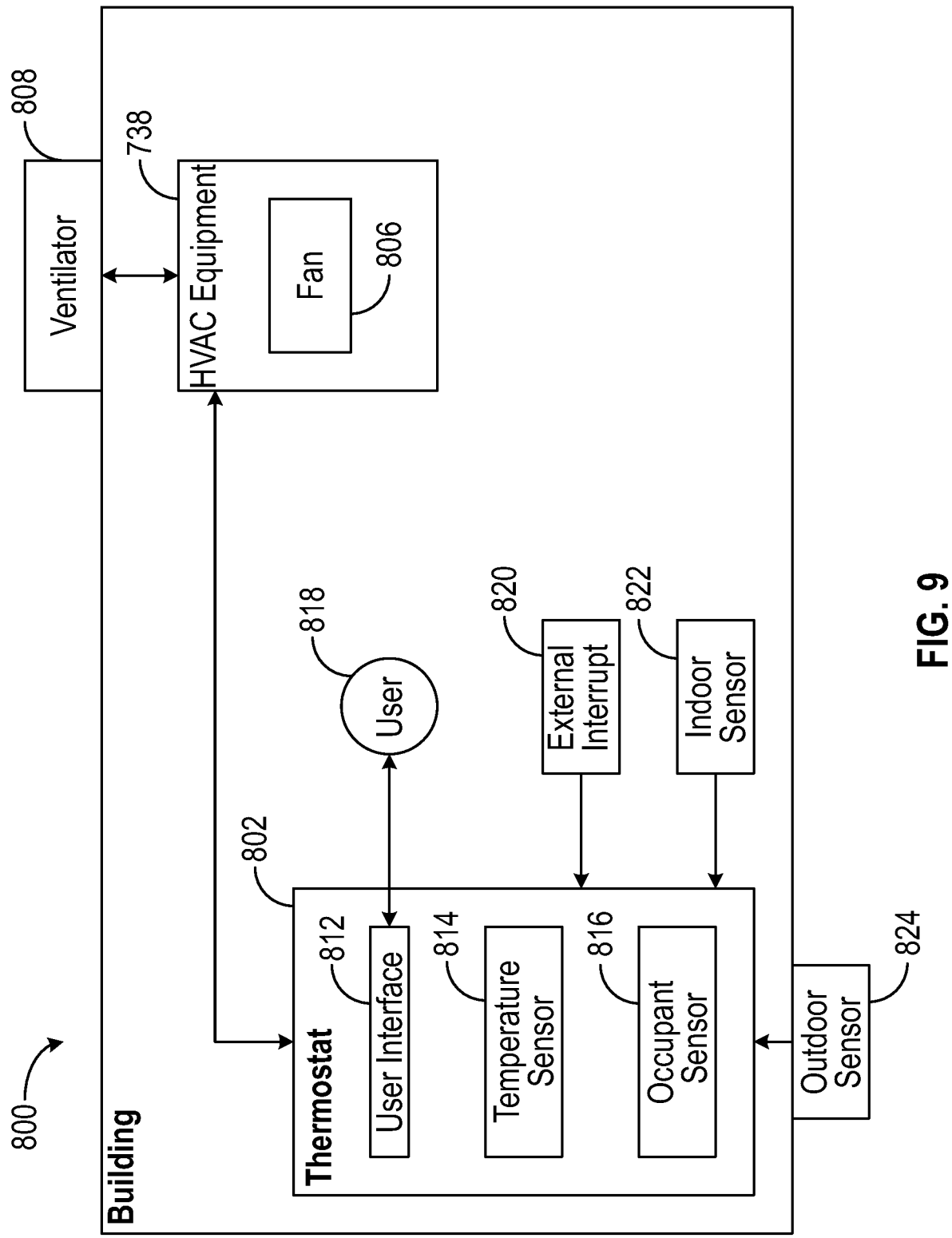
FIG. 9 is a schematic block diagram of a thermostat in a building, according to an exemplary embodiment.
Figure 10:
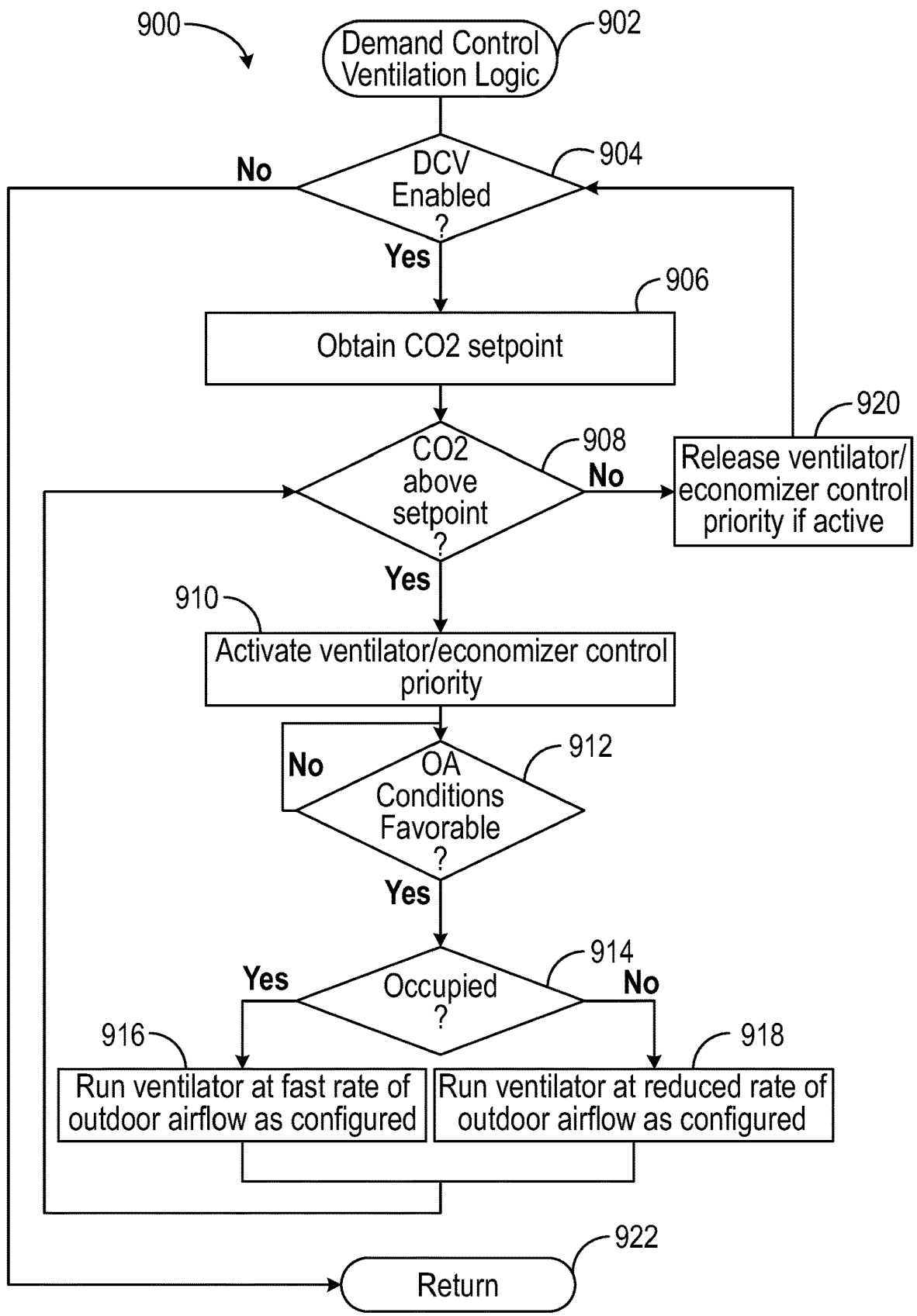
FIG. 10 is a flowchart of a process for implementing demand control ventilation in a space, according to an exemplary embodiment.
Figure 11:
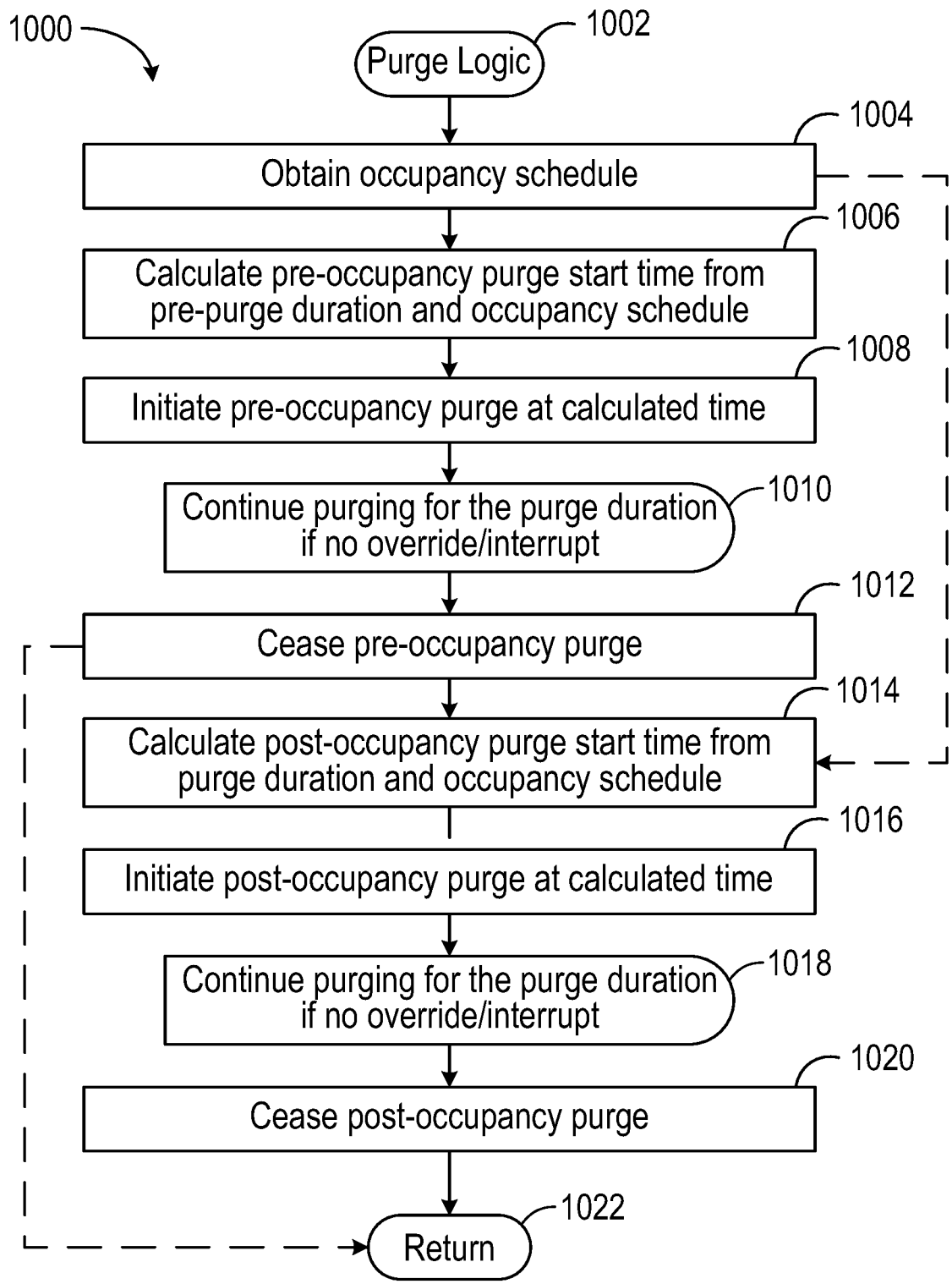
FIG. 11 is a flowchart of a process for implementing epidemic control ventilation in a space, according to an exemplary embodiment.

Referring generally to FIGS. 9-11, a thermostat may be configured to control the air quality in a space or building. Indoor air is often more contaminated than outdoor air, and the contaminants can include pathogens, contagions, and other disease-causing agents that may pass from one occupant to another. Over time, the concentrations of pathogens in the space can increase and without sufficient ventilation space there is an greater chance occupants infect one another. The regular exchange of indoor air with outdoor air can reduce the concentration of such pathogens in a space. A thermostat can be configured to perform such an air exchange periodically and/or on-demand using the cleaner outdoor air to assist in removing the concentration of airborne infectious particles and protect the health of the occupants.

In some embodiments, the thermostat can modulate one or more dampers in HVAC equipment (e.g., outside air damper 420 of AHU 402) to control the intake of outdoor airflow into the space and exchange clean outdoor air for indoor air. The HVAC equipment may include economizer-type air handling units (e.g., AHU 402) with a return air intake configured to receive return air from within a building, an outdoor air intake configured to receive outdoor air from outside the building, and an air discharge configured to provide discharge air to the building. In some embodiments, the economizer-type AHU includes one or more dampers (e.g., dampers 416-420) whose position may be modulated to control the sources and flow of air into a space. The position of a damper may include a fully closed position at 0% and a fully open position at 100%, with intermediate positions in-between. In some embodiments, the minimum ventilator position is set by a user and may be between 0%-100%. An open damper allows air to pass through the system.

In some embodiments, the thermostat can be configured to ventilate a space based on one or more indoor air quality (IAQ) values in a space. The indoor air quality values may include concentrations of gasses or particles in a space (e.g., pollutants, pathogens, etc.) and/or other measurable air quality parameters. Pollutants may include carbon dioxide, carbon monoxide, nitrogen, radon, lead, asbestos, indoor particulate matter, volatile organic compounds, etc. For example, the thermostat may be configured to take in fresh outdoor air in order to maintain the space $CO_2$ value at or below a $CO_2$ setpoint. The $CO_2$ value of a space can be used as an indirect measurement of the occupancy state of a space and the concentration of airborne infectious particles. Higher $CO_2$ values indicate increased occupancy and likely higher concentrations of other occupant byproducts such as pathogens. The thermostat can control the rate of outdoor air into the space when the $CO_2$ value breaches the setpoint, and exchange the indoor air in the space with outdoor air, lowering not only the $CO_2$ value of the space but also the concentration of the infectious particles.

In some embodiments, the thermostat additionally controls the rate of outdoor airflow into the space based in part on whether the space is occupied or unoccupied. For example, when the occupancy state of the space is unoccupied, the thermostat may reduce or even completely eliminate the rate of outdoor airflow into the space. An unoccupied space has a reduced risk of infectious particles in the air infecting a person, and the thermostat can be configured to reduce the rate of outdoor airflow into the space in response to the reduced risk. Reducing the rate of outdoor airflow into the space saves energy, as the fan may run at a slower speed or for a shorter period of time and less outdoor air must be conditioned.

In addition or alternatively to the indirect indication of occupancy provided by the $CO_2$ value in the space, the thermostat can be configured to determine occupancy of the space by referencing an occupancy schedule and/or the input of an occupant sensor in the space. In some embodiments, the thermostat can be configured to purge the space (i.e., take in outdoor air and ventilate indoor air) prior to and/or after occupied states to achieve a clean air supply. The duration of the purge can depend on the size of the space, the air change rate, a predetermined purge period, or other parameters sufficient to determine the purge appropriately reduce the concentration of airborne pathogens.

Referring now to FIG. 9, a drawing of a block diagram of a building 800 with a thermostat 802 and HVAC equipment 738 is shown, according to some embodiments. The building 800 may include one or more indoor sensors 822, and one or more outdoor sensors 824, one or more blower fans 806, and one or more ventilators 808.

The thermostat 802 includes a user interface 812 and can include the features and provide the operations of control device 214 (e.g., FIGS. 5-8) for the systems illustrated in FIGS. 1-4 or the building 800. The user interface 812 may be an interactive pixelated display (liquid crystal display (LCD)) and touch screen that can display variable information to a user and receive an input from the user. The thermostat 802 includes a temperature sensor 814 and an occupant sensor 816. In some embodiments, the thermostat 802 incudes additional or fewer sensors. While shown to include temperature sensor 814 and occupant sensor 816 as components of the thermostat 802, in some embodiments the sensors are external sensors communicably coupled to the thermostat 802.

The thermostat 802 is configured to receive inputs from user 818, external interrupt 820, indoor sensor 822, and outdoor sensor 824. In some embodiments, the thermostat 802 is configured to generate control signals for HVAC equipment 738 via a wired or wireless communication link based on the inputs. In various embodiments, the thermostat 802 generates control signals for the HVAC equipment 738 based on the indoor ambient temperature (e.g., measured via an indoor ambient temperature sensor), the outdoor temperature (e.g., measured via an outdoor ambient temperature sensor), a temperature set point (e.g., set by a user via a user input on user interface 812), the indoor $CO_2$ value (e.g., measured via an indoor $CO_2$ sensor), the $CO_2$ setpoint (e.g., default setpoint set by an administer), and/or occupancy (e.g., determined by an occupancy schedule, occupant sensor, etc.) and provides the control signal to the HVAC equipment 738.

In some embodiments, the thermostat 802 includes a detachable unit which provides thermostat functions and can include various sensors, power circuits, interfaces and other non-display components of a thermostat. The detachable unit may provide the control signals for the HVAC equipment vie a three or four wire connection in some embodiments. The detachable unit may receive the control signals or data indicative of the control signals wirelessly or via a wired connection from user interface 812 in some embodiments.

HVAC equipment 738 provides heated and/or cooled air to building 800 in some embodiments. Although described with respect to building 800, embodiments of the systems and methods described herein can be utilized in a cooling unit or a heating unit in a variety of applications including commercial and/or residential HVAC units (e.g., AHU 402, roof top units, etc.). In general, a building 800 includes refrigerant conduits that operatively couple an indoor unit to an outdoor unit of air HVAC equipment 738. Indoor unit may be positioned in a utility space, an attic, a basement, and so forth. Outdoor unit is situated adjacent to a side of building 800. Refrigerant conduits transfer refrigerant between indoor unit and outdoor unit, transferring primarily liquid refrigerant in one direction and primarily vaporized refrigerant in an opposite direction. A furnace/boiler or heat pump of the air conditioner/heat pump of the HVAC equipment 738 is controlled to provide heat to the building 800. In some embodiments, thermostat 802 is in communication with a network via a wired local network or wireless network.

The indoor sensors 822 can include temperature sensors, humidity sensors, $CO_2$ sensors, occupant sensors, and volatile organic compound (VOC) sensors. In one embodiment, the indoor sensors 822 are located at multiple points within the building 800. However, in some embodiments, one or more of the indoor sensors 822 may be integrated into the control device 214. The outdoor sensors 824 may also include temperature sensors, humidity sensors, $CO_2$ sensors, VOC sensors and the like. outdoor sensors 824 may further include weather sensors, light sensors, or other air quality sensors.

The blower fans 806 are configured to circulate air through the HVAC equipment 738 and throughout the building 800. In some embodiments, the blower fans 806 may be used as supply fans for the HVAC equipment 738, (e.g. supplies air to the HVAC equipment 738). The ventilator 808 is configured to ventilate the air inside the building 800 to the outside of the building 800. The ventilator 808 is further configured to bring outside air into the building 800. This can provide fresh air into the building 800, which may then be circulated by the blower fan 806, and used to control the air quality in the building 800. The ventilator 808 may be a traditional ventilator, an energy recovery ventilator, a heat recovery ventilator, or other applicable ventilator type.

The blower fan 806 and the ventilator 808 may be controlled to provide air quality enhancements within the building. In some embodiments, the control device 214 can control the blower fan 806 and the ventilators 808 to reduce the amount of energy used by the system by using outdoor air that meets one or more requirements as supply air without needing to condition the outdoor air. The control device 214 may use data provided by the indoor sensors 822 and/or the outdoor sensors 824 to properly control the blower fan 806 and the ventilators 808, as described herein.

Demand Control Ventilation

Turning now to FIG. 10, a process 900 for providing demand control ventilation to a space is shown, according to some embodiments. In systems with an economizer including both a blower fan 806 and a ventilator 808, the ventilator 808 may be operated in conjunction with the blower fan 806, based on certain conditions being met as described below. In one embodiment, the process 900 is controlled by the control device 214. Specifically, the process 900 may be controlled by the ventilation module 744 of control device 214. The process 900 may start at process block 902.

At process block 904, the control device 214 determines if the Demand Control Ventilation (DCV) feature for the control device 214 is enabled. In some embodiments, the DCV feature is enabled by a user via a user input to the control device 214 (e.g., via user interface 702). In some embodiments, the control device 214 determines if DCV is enabled by referencing a DCV object in a building management system. If the control device 214 determines the DCV is not enabled, the process 900 is shown to proceed to return process block 922.

If the control device 214 determines the DCV is enabled, process 900 is shown proceeding to process block 906 and the control device 214 may obtain a $CO_2$ setpoint for a space. The $CO_2$ setpoint may be set by a user via user interface 702 of control device 214. In some embodiments, the $CO_2$ setpoint is based on promulgated standards, guidelines, (e.g., ASHRAE guidelines) for building safety. The $CO_2$ setpoint can be a discrete value, but may also be a value range. For example, the $CO_2$ setpoint may be 800-1000 ppm. As described above, the $CO_2$ setpoint can indirectly represent the occupancy levels in a space. A $CO_2$ setpoint may also be obtained by the control device 214 from a building management system (BMS). While FIG. 10 is shown referencing a $CO_2$ setpoint and value, it should be understood that process 900 may refer to other parameters in a space, (e.g., a VOC setpoint, pathogen concentration, carbon monoxide setpoint, etc.). One or more sensors 714 of controller 214 may be configured to measure these parameters (e.g., air quality sensor 720) for use in process 900 in place of the concentration of $CO_2$.

At process block 908, the control device 214 may determine if the $CO_2$ value in a space is above the $CO_2$ setpoint. The control device 214 can measure the $CO_2$ value in a space using a $CO_2$ sensor (e.g., air quality sensor 720) built into the control device 214. Still in other embodiments, the control device 214 is connected to an external $CO_2$ sensor (e.g., indoor sensor 822). The control device 214 may also be connected to a BMS and receive the $CO_2$ value for the space via the BMS. As described above, in some embodiments other parameters aside from $CO_2$ concentration are used, including the concentration of other gases, particles, pathogens, etc.

In some embodiments, when sampling the $CO_2$ value of a space the control device 214 is configured to generate an alarm on a display of the control device 214 such as electronic display 706 when the $CO_2$ value of the space is above a critical threshold. A control device 214 connected to a BMS can propagate the alarm to a supervisory device (e.g., BMS controller 466). The $CO_2$ value can also be available to users and supervisors via a BACnet interface of the BMS. In some embodiments, the critical threshold is set by a user via user interface 702. For example, the control device 214 can be configured to generate an alarm if the $CO_2$ value of the space is about 1100 ppm. In some embodiments, in addition to generating the alarm, the control device 214 can be configured to immediately operate a ventilator in space in order to reduce the concentration of $CO_2$ in the space.

If the $CO_2$ value for the space is determined to be above the $CO_2$ setpoint, the process 900 may then activate the ventilator/economizer priority control in process block 910. The normal control scheme of a control may control the operation of a ventilator/economizer for a space. The DCV logic when enabled, and when it determines the $CO_2$ concentration in a space is above the $CO_2$ setpoint, can be configured to take over control of the ventilator/economizer and give its commands priority over those from the normal control scheme. For example, the normal control scheme may direct the position of a damper in an economizer to 50%. The DCV may determine the $CO_2$ value is above the $CO_2$ setpoint and prepare to ventilate a space, but to do so it needs to take control of the damper position, and so it will activate control priority ensuring it can move the damper despite the control instructions from the normal control scheme.

After taking control priority, the control device 214 may determine if the outdoor air conditions are favorable for a demand control ventilation process at process block 912. As described above, the $CO_2$ value of space can be an indirect measurement of the occupancy level of a space, as well as the concentration of other pollutants and pathogens in a space. At process block 912 the control device 214 may determine if the $CO_2$ value is above the $CO_2$ setpoint that the concentration of pathogens in the space is undesirable, and an air exchange taking in clean outdoor air would be favorable.

In some embodiments, the control device 214 may determine if outdoor air conditions are favorable by evaluating data from one or more sensors, such as air quality sensors 720, to determine an air quality of the indoor and air. In some embodiments, the control device 214 may obtain air quality data from the indoor sensors 822 and the outdoor sensors 824. The condition of the outdoor air may be evaluated based on certain measurements, such as CO2 levels, VOC levels, pollen levels, temperature, humidity, etc. The control device 214 may determine that the outdoor air quality is favorable when one or more of the measurements are below or above certain threshold values. For example, if the indoor air temperature is above the indoor air setpoint, and the outdoor air is a lower temperature than the indoor air, the control device 214 may determine outdoor air conditions are favorable, as the lower temperature outdoor air can be used as free cooling for the space while simultaneously assisting with the removal of pathogens due to the air exchange.

If the outdoor air condition is determined to be favorable at process block 912, the process 900 may then determine if the space is occupied at process block 914. In some embodiments, the control device 214 may determine the occupancy status of a space using occupancy module 750. In some embodiments, the process 900 may not depend on the occupancy of the space and may pass directly to process block 916.

The control device 214 can determine if the space is occupied based on an occupancy schedule. The occupancy schedule can be stored in control device 214 or provided to the control device 214 by a supervisory controller, for example a BMS connected to control device 214. The occupancy schedule may include scheduled periods of occupancy set by a user via a user interface of control device 214 (e.g., user interface 702). In some embodiments, the control device 214 determines if space is occupied according to the input from an indoor sensor 822 such as an occupant sensor provided in the space. The occupant sensor may be a near-field communications (NFC) sensor, a radio frequency identification (RFID) sensor, a Bluetooth sensor, a capacitive proximity sensor, a biometric sensor, an infrared (IR) sensor, or any other sensor configured to detect the presence of a person or device.

If the space is determined to be occupied at process block 914, the process 900 begins ventilating the space by running the ventilator (e.g., ventilator 808) at a fast rate of outdoor airflow as configured by a user at process block 916. At process block 916, the control device 214 may, for example, control the position of a damper in the HVAC equipment 738 to open the space to the outdoor air and take the outdoor air into the space. In some embodiments, the control device 214 may also operate a fan (e.g., fan 806) to draw the outdoor air through the damper and into the space. The rate of outdoor air flow into the space can depend on the position of one or more dampers, the speed of the fan, and the indoor and outdoor temperatures. In some embodiments, the rate of outdoor airflow is set by a user via user interface 702. A user may set a desired fast rate of outdoor air flow by providing a user input indicating a desired airflow rate, damper position, and/or fan speed. In some embodiments, the airflow rate is configured by a supervisory device of a BMS.

Returning to process block 914, if the control device 214 determines the space is not occupied, the process 900 begins ventilating the space by running the ventilator at a second, reduced rate of outdoor air flow in to the space at process block 918. Exchanging the indoor air with outdoor air can be energy intensive as requires running one or more fans and may require the HVAC equipment 738 to condition the outdoor air before supplying it to the space, and the rate of outdoor air flow itself can contribute to this cost. When a space is determined to be unoccupied and the pathogens in a space (as indicated by the $CO_2$ levels) are no longer interacting with any occupants, the need for demand control ventilation is reduced. Accordingly, the control device 214 can be configured to reduce the rate of outdoor airflow into a space when the space is determined to be unoccupied to save energy and money. In some embodiments, the rate is reduced to zero and no exchange takes place when a space is unoccupied. Still, in other embodiments the rate is reduced to a non-zero value that is simply less than the rate of outdoor air flow when the space is determined to be occupied as configured by the user. A user/supervisory device may set, at a prior point in time, a desired airflow rate as described above.

In some embodiments, it may be beneficial to engage a demand control ventilation feature such as process 900 even when a space is unoccupied as a precautionary measure to ensure a space is well-ventilated when an occupant does arrive. A damper remaining entirely closed when a space is unoccupied may create a situation where before $CO_2$ levels, and relatedly, pathogen levels in a space are reduced by the typical operation of HVAC equipment in space, are brought below a desired level an occupant enters the space and encounters the space with its elevated $CO_2$ and pathogen concentrations. By allowing a space to continue to provide demand control ventilation even when unoccupied, even at a reduced rate, the likelihood of this scenario is reduced.

After either process block 916 or process block 918, process 900 returns to process block 908 and determines if the $CO_2$ value in a space is still above the $CO_2$ setpoint. In some embodiments, on returning to process block 916 the control device 214 determines if the $CO_2$ value is not just below the $CO_2$ setpoint, but at a certain value i.e., an acceptable $CO_2$ value before proceeding. For example, the $CO_2$ setpoint may be 800 ppm, and the control device 214 is configured to turn proceed to process block 920 until the $CO_2$ value of the space of the space is below an acceptable $CO_2$ value of 400 ppm. Process 900 then proceeds to process block 922 and returns to initial process block 902 in process 900.

Referring still to process block 908, if the $CO_2$ value of the space is still above the setpoint, process 900 proceeds to process block 910 as described above. In some embodiments, the control device 214 is configured to ventilate a space for a predetermined amount of time before checking the $CO_2$ value of the space again at process block 908. For example, a user may set a default purge time of one hour, and once the $CO_2$ value is initially determined to be above the $CO_2$ setpoint the purge duration must elapse before the control device 214 may end the purge and shut off the ventilator 808. The purge duration may depend on the air exchange rate. The air exchange rate is the number of times the air is replaced in a space for a period of time (e.g., air changes per hour). The air exchange rate for a space is represented by the volumetric flow rate of air into the space divided by the volume of the space. The thermostat 802 can calculate the air exchange rate for s space, and use the air exchange rate to calculate how long the purge time must be for a desired number of air changes. For example, the control device 214 can be configured to maintain running the ventilator at process blocks 916 and 918 until three air changes in the space have been completed. Relatedly, a control device 214 may be configured to perform a maximum number of air changes in a day. If the maximum number of air changes is obtained, the control device 214 may then be configured to check the $CO_2$ value and determine if the purge can end.

If at process block 908 the control device 214 determines the $CO_2$ value of the space is not above the $CO_2$ setpoint, the process 900 proceeds to process block 920 and releases ventilator/economizer control, if active. For example, if process 900 has not previously proceeded to process block 910 ventilator/economizer priority for DCV may not be activated. If process 900 has activated ventilator/economizer control at process block 910, then at process block 920 that control is deactivated and control of the ventilator/economizer passes back to the normal control scheme. In some embodiments, control may pass to another scheme indicating it has control priority (e.g., an epidemic control ventilation scheme). In some embodiments, the control device 214 is configured to turn off the ventilator at process block 920. After releasing control of the ventilator/economizer at process block 920, process 900 proceeds back to process block 904.

At any point in process 900, an interrupt/override may be provided to control device 214 which may indicate that control device 214 should terminate process 900. For example, the interrupt may be an external interrupt as described below.

Epidemic Control Ventilation

Turning now to FIG. 11, a process 1000 for purging a zone of pathogens through ventilation is shown, according to an exemplary embodiment. In some situations, it is preferable to implement supplemental measures for ventilating a space in addition to or alternatively to the demand control ventilation features discussed above. For example, a thermostat may use $CO_2$ levels as a proxy for the occupancy level of a space (and therefore the pathogen load of a space) but this is an indirect method that may in some cases underestimate the pathogen load. To provide a well-ventilated space regardless of the $CO_2$ levels (or the concentration of other measured parameters such as VOC levels, pathogen load, etc.) in some embodiments a thermostat (e.g., control device 214, thermostat 802, etc.) may be configured to ventilate a zone (i.e., purge a zone) prior to and/or post occupancy. For example, a thermostat may be configured to ramp up a damper from a minimum position to a purge damper position (e.g., 80%, 90%, 100%, or any other percentage) for a purge period before and/or after occupancy of the space. The purge period may be a default time period, based on a user input, or depend on a calculated air exchange rate and desired number of air changes for a space. For example, a purge duration may persist such that three air changes in a space are performed. Pre- and post-occupancy purges reduce the risk of an occupant from a first occupied period passing contagions to an occupant in a later occupied period. The air exchange rate may indicate the rate of outdoor airflow in a space, and can depend on the damper positions and the speed of one or more fans in the HVAC equipment.

In some embodiments, the purge damper position is adjusted based on a temperature of the indoor space and/or the temperature of the outdoor air. In some embodiments, purge damper position can be actively adjusted based on the rate of change of the temperature of the space. The rate of change of the temperature in a space is dependent on the temperature of the space, the temperature of the outdoor air, the damper position, the flow rate of air into the space, and the temperature characteristics of the space's surrounding environment. For example, on cold days when the temperature of the outdoor air is less than the temperature of the indoor air, as the space is purged the temperature in the space will start to decrease. The damper position can be actively adjusted during this process. In some embodiments, the purge damper position is adjusted based on the outdoor air temperature. In some embodiments, the purge damper position is adjusted to ensure the indoor temperature meets one or more thresholds (i.e., the rate of change is within a predetermined limit, the temperature of the space is maintained above a predetermined threshold, etc.). For example, on warmer days the damper position during a purging operation can be actively adjusted to ensure the space temperature remains below a predetermined threshold and/or to ensure that the rate of change of the temperature in the space is below a predetermined threshold. In some embodiments, a user can set a minimum purge damper position. For example, when the damper position is being actively controlled based on the temperature of the space, the damper position can be limited to be at least above a certain percentage. This lower limit can be set by a user to ensure that during a purge operation enough air is still ventilated. In some embodiments, the purge damper position itself can be preset by a user of the thermostat. For example, a user can set the purge damper position to 80%, such that during a purge cycle the damper is opened to 80%.

In some embodiments, a thermostat with epidemic control ventilation can adjust the control of ventilation in a room based on the fact that pre and/or post occupancy purges are implemented. For example, a system with pre-occupancy purges may otherwise operate in a minimum ventilation mode during an unoccupied mode as the space will be purged before occupancy in a pre-occupancy purge and increased ventilation prior to the purge may be inefficient. In some embodiments, the system may also run in a minimum ventilation mode during an occupied state based on pre- and/or post occupancy purges.

When implementing pre- and/or post occupancy purges according to process 1000, in systems including both a blower fan 806 and a ventilator 808, the ventilator 808 may be operated in conjunction with the blower fan 806, based on certain conditions being met as described below. In one embodiment, the process 1000 is controlled by as control device 214. Specifically, the process 1000 may be controlled by the purge module 746 of control device 214. The process 1000 may start at process block 1002. In some embodiments, process 1000 requires measurements of the $CO_2$ value in a space (e.g., from indoor sensor 822), a damper feedback value indicating its position (e.g., from one or more dampers 416-420, an outside air temperature value (e.g., from outdoor sensor 824), a supply air temperature value (e.g., from sensors in AHU 106), and a $CO_2$ setpoint. In some embodiments, process 1000 includes receives measurements of additional parameters of a space from air sensors (e.g., indoor sensor 822, outdoor sensor 824, such as a concentration of asbestos, biological pollutants, carbon monoxide, nitrogen dioxide, natural gas, and/or the viral or pathogen load of a space, amongst other measurable air quality parameters. Process 1000 may use these values, amongst others, to facilitate pre- and/or post occupancy purges of zones.

Before running the purge logic of process 1000, the control device 214 can be configured to request a user set a minimum ventilation position for a damper (e.g., in an economizer-type air handling unit such AHU 402) between 0% and 100%. The minimum ventilation position may apply during both the occupied and unoccupied mode for the space. The minimum ventilation position may be used as a default position that the damper is returned to after a purge. In some embodiments, a user may also input a desired purge duration and/or a desired number of air changes.

At process block 1004, the control device 214 obtains an occupancy schedule for the space. The occupancy schedule indicates when a space is set to an occupied mode and unoccupied mode. In some embodiments, the occupancy schedule is provided by a BMS connected to the control device 214 (e.g., by BMS controller 466). In some embodiments, the occupancy schedule is provided by a user via user interface 702. The occupancy schedule may take precedent over other indications of occupancy such as from an occupant sensor. Occupancy may also be determined by a combination of inputs from an occupancy schedule and an occupant sensor. For example, the occupancy schedule may indicate an unoccupied mode for a space starts at 10 PM, but the occupant sensor may indicate that from at 10:00 PM the space is still occupied. Based on the input from the occupant sensor, the control device 214 can determine that despite the scheduled unoccupied mode the space is still occupied, and delay a post-occupancy purge until the occupancy schedule and the occupancy schedule agree the space is unoccupied. In one embodiment, if no occupancy schedule is available, the control device 214 can trigger an alarm and disable the epidemic purge ventilation.

In some embodiments, process 1000 can take priority over other processes that control the ventilation in a space. For example, a thermostat configured with a demand control ventilation process (e.g., process 900) as described above may also implement an epidemic control ventilation process such as process 1000. In some embodiments, process 1000 may supersede process 900 for control of ventilation in a room. Still in other embodiments, the DCV control may supersede the control indicated in process 1000.

At process block 1006, the control device 214 calculates the pre-occupancy purge state time based on the purge duration and the occupancy schedule. The purge duration may be received from a user input, from a BMS/supervisory device, or be a default value stored in the control device 214. In some embodiments, the control device 214 calculates the purge duration based on a desired number of air changes and measured/calculated air exchange rate for space. A user can set the purge duration indirectly by selecting a desired number of air changes in a zone that the purge should complete before the purge ends. In such embodiments, the control device 214 can be configured to calculate how long the HVAC equipment will take to complete the requested number of air changes and calculate the pre-occupancy purge start time accordingly.

In some embodiments, the pre-occupancy purge start time is the latest time at which the purge duration must start for the purge to complete before the beginning of the first occupied period as indicated by the occupancy schedule. It can be calculated by subtracting the purge duration from the start time of the first occupied period. For example, an occupancy schedule for a day may indicate the first occupied period for the space begins at 8:00 AM. With a purge duration of 4:00 hours, the control device 214 can calculate the pre-occupancy purge start time to be 4:00 AM. The control device 214 may calculate the pre-occupancy purge start time day-by-day. That is, if the occupancy schedule is a weekly schedule, the control device may partition the schedule into daily schedules, and calculate pre-occupancy purge start times for each day, such that each day the purge begins at the latest time at which it can be completed before the beginning of the occupied period for that day.

After calculating the pre-occupancy purge time, process 1000 proceeds to process block 1008 and initiates the preoccupancy purge at the calculated time. For example, with a purge duration of 1 hour, the control device 214 may initiate a pre-occupancy purge at 7:00 AM based on a schedule indicating the occupied period starts at 8:00 AM (i.e., for the last hour of the unoccupied period before the first occupied period of that day). During the pre-occupancy purge the control device 214 can modulate the position of one or more dampers (e.g., dampers 416-420) in HVAC equipment 738 from its current position to a purge damper position for the duration of the purge. The purge damper position may be a preset position (e.g., 80%, 90%, 100%, etc.). A user may set the purge damper position. The purge damper position may be based on a temperature of the space and/or a rate of change of the temperature of the indoor space. A user may additionally set a minimum purge damper position the damper position is not to fall below when being actively controlled based on temperature. The purge The purge includes exchanging indoor air for outdoor air to ventilate a space and reduce the concentration of one or more air quality parameters.

After initiating the purge at the calculated time at process block 1008, the control device 214 can continue purging the space for the purge duration, if there is no override or interrupt. For example, the control device 214 may receive a signal from an external interrupt 752 indicating control device 214 should stop its control scheme including disable all control outputs. In some embodiments, the interrupt may be received from a user. Still in other embodiments, the interrupt may be received from a supervisory device in a BMS. In some embodiments, the interrupt may be based on an outdoor air quality. In some embodiments, the control device 214 can determine if outdoor environmental conditions are favorable for ventilation during process 1000. For example, the control device 214 may determine the outdoor environmental conditions as described above with reference to process block 910.

If an override/interrupt is received, or if the purge duration has elapsed, the control device 214 may cease the pre-occupancy purge and return the position of one or more dampers from the purge damper position to the position indicated by the control device 214's normal control scheme at process block 1012. In some embodiments, the control device 214 returns control of the dampers to other processes, such as a demand control ventilation process, and the damper is positioned as required by such processes. In one embodiment, the epidemic control ventilation represented in process 1000 performs only pre-occupancy purges, and after process block 1012 proceeds to return at process block 1022. In another embodiment, the purge logic proceeds from process block 1004 directly to process block 1014 and performs only post-occupancy purges according to process blocks 1014-1020. Still in another embodiment, the control device 214 may include both pre and post occupancy purges. A user may indicate via a user interface (e.g., user interface 702) whether control device 214 should perform pre-occupancy purges, post-occupancy purges, or both. In some embodiments, the option to enable epidemic control ventilation (including pre and/or post occupancy purges) is exposed to a BMS (e.g., to BMS controller 466) through a point object enabling remote activation and deactivation of the feature by a BMS manager.

In embodiments with post-occupancy purge, at process block 1014 the process 1000 can calculate the post-occupancy purge start time from the purge duration and the occupancy schedule. In some embodiments, the post-occupancy purge start time is the end of the last occupied period for the schedule period as indicated by the occupancy schedule (i.e., the beginning of the last unoccupied period for the schedule).

Epidemic control ventilation may also affect other characteristics of a space. For example, ventilation can raise or lower the relative humidity in a space. A thermostat such as control device 214 performing epidemic control ventilation can monitor the relative humidity of the space and trigger an alarm when it exceeds a preset range (e.g., 40%-60% RH). In some embodiments, the control device 214 can delay or cancel an otherwise scheduled pre and/or post occupancy purge if it determines outside air conditions are unfavorable. Unfavorable conditions may include the delta between the outside air temperature and the indoor air temperature exceeding a predetermined threshold, the outside air temperature being too low or too high, the outside air RH being too low or too high, the air quality of the outside air is poorer than the air quality of the inside air, etc.

External Interrupt

Figure 12:
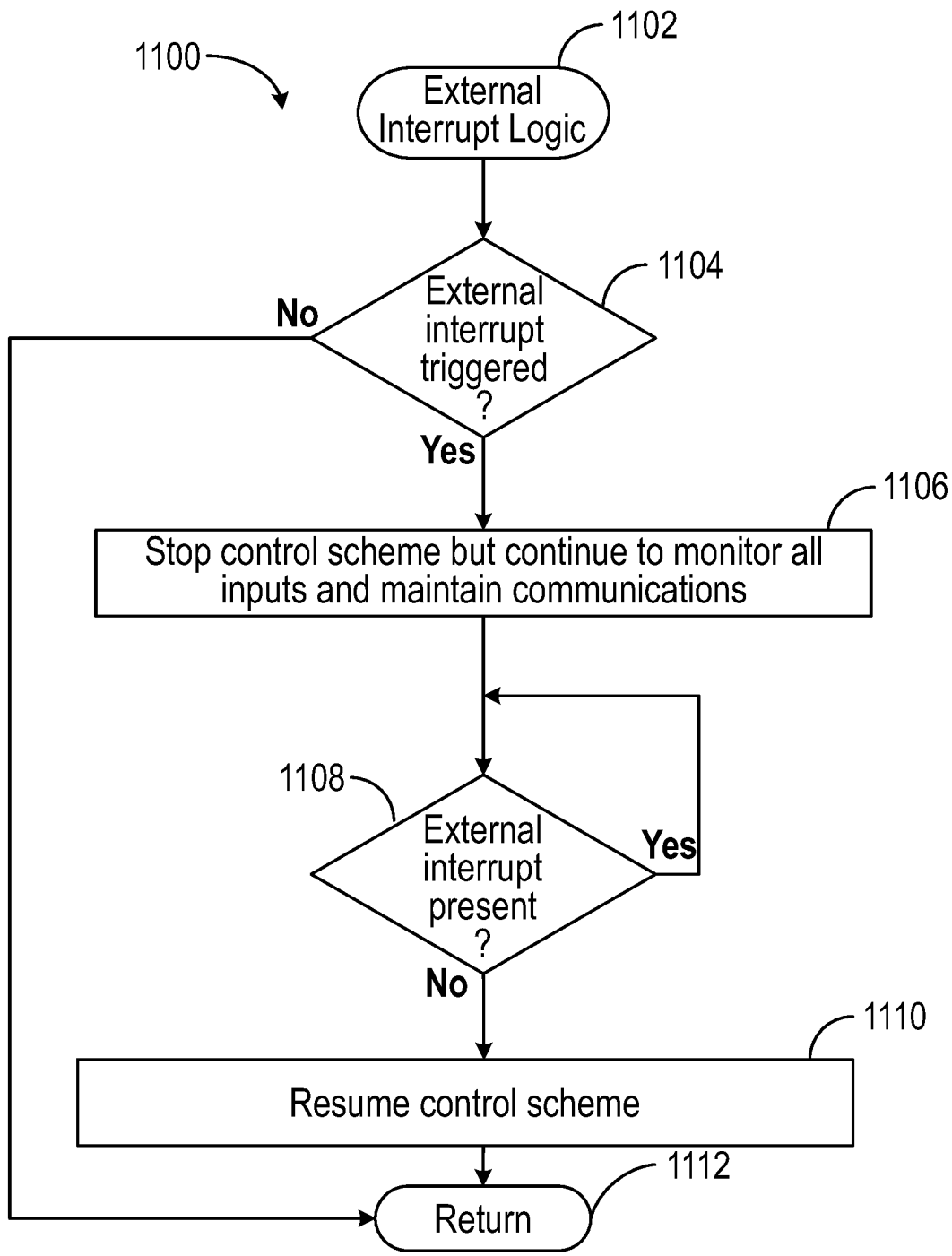
FIG. 12 is a flowchart of a process for implementing an external interrupt in a building equipped with an HVAC system, according to an exemplary embodiment.

Referring generally to FIG. 12, a thermostat, such as control device 214 may operate to control the building equipment in a space according to a control scheme. The control scheme may include logic for providing one or more command instructions for building equipment to control the environment of a space. In some embodiments, the thermostat may receive an external interrupt signal. In some embodiments, in response to the external interrupt signal the thermostat may be configured to stop the thermostat control scheme, and thereby cease the provision of command instructions to building equipment. In some embodiments, though the control scheme is stopped, the thermostat may continue to receive input signals and process other forms of communication, such as communicating with a BMS and otherwise operate normally. For example, on receiving an interrupt signal, a thermostat may be configured to stop controlling the movement of a damper, but to still receive a temperature signal from a temperature sensor and calculate a damper position based on the signal.

In some embodiments, a thermostat such as control device 214 may include one or more binary input (BI) terminals for receiving inputs and adding additional features to the system. The BI terminals can include configurable BIs accessible to a user. Based on the status of a given BI, the thermostat can be configured to perform a control action. The control action may include disabling one or more outputs of the thermostat (e.g., control instructions for HVAC equipment), setting an occupancy value, initiating an alert, etc. BIs can include window sensors, door sensors, motion sensors, proximity sensors, fan on/off status inputs, dirty filter inputs, temporary occupancy inputs, direct occupancy override inputs, etc. In one embodiment, the sensors can be virtual sensors whose value can be controlled by a user of the thermostat.

In some embodiments, the BI is configured as an external interrupt. As described above, the external interrupt may act as trigger for the control device 214 and receive either a high or low signal (e.g., true or false, activate or inactive, etc.), such that the control device 214 is configured to disable its control scheme when the external interrupt is triggered (e.g., signal goes high, signal goes low). In some embodiments, the control scheme is stopped, but the rest of the control device 214 remains in operation. That is, the thermostat may operate in an otherwise normal fashion, receiving inputs and monitoring a space, and communicating with other pieces of equipment, and in general performing such associated determinations according to its programming, except the thermostat will not provide control signals for controlling HVAC equipment. The associated determinations may include control signals for building equipment (e.g., damper positions, fan states, etc.), setpoints for a space, occupancy states, etc. and any other value or calculation that the thermostat configured to determine. In other words the thermostat can monitor and log the environmental conditions of the space as usual, and communicate information to a BMS or another device, but all output control signals for controlling the operation of HVAC equipment typically provided according to the control scheme are otherwise disabled.

An external interrupt can be initiated by both physical or virtual switches. In some embodiments, multiple switches are connected as an external interrupt, the activation of any of which would halt all outputs of the thermostat. In some embodiments, the external interrupt is presented to a user via user interface of a thermostat (e.g., user interface 702, 812).

Turning now to FIG. 12, a process 1100 for providing an external interrupt to an HVAC system is shown, according to an exemplary embodiment. In one embodiment, the process 1100 is controlled by the control device 214. Specifically, the process 1100 may be controlled by the external interrupt module 748 of the control device 214. The process 1100 may start at process block 1102 for external interrupt logic.

At process block 1104, the control device 214 determines if an external interrupt was trigged. As described above, the control device 214 may include one or more binary inputs (BIs) that may be configured to act as an external interrupt. An external interrupt signal may be provided by one or more switches and/or sensors in a space (e.g., external interrupt 758, external interrupt 820, etc.) or by virtual switches. For example, the external interrupt can be connected to a temperature-controlled relay configured to sense the temperature of a heating coil exposed to outside air. The relay may activate when the temperature of the heating coil falls below a minimum threshold indicating that the heating coil may be frozen. In order to avoid further damage to the heating coil by attempting to operate it while frozen, the control device 214 may receive the signal from the temperature-control relay at the external interrupt (e.g., the binary input configured as an external interrupt) and stop the control scheme of the control device 214, ensuring heating coil is not operated until the external interrupt is no longer present. In some embodiments, the external interrupt is triggered (i.e., activated) when the binary input (BI) value is driven high. Still in other embodiments the interrupt is triggered when the value is driven low. If the control device 214 determines the external interrupt is not trigged, process 1100 can return to process block 1112.

If the control device 214 determines the external interrupt is triggered, the thermostat proceeds to stop the thermostat control scheme, but continue to monitor all inputs and maintain communications at process block 1106. Stopping the control scheme may include ceasing to provide control outputs including control signals/command instructions to equipment operated by the thermostat. While outputs are disabled, the thermostat may still be active and otherwise receive sensor signals and maintain communications without interrupt. By allowing a thermostat to be active despite disabling output control, the external interrupt can make equipment safe for service and repair without the need for a cold start when repairs are completed. Instead, the interrupt can be deactivated and the thermostat outputs restored and directed as indicated by the still-running control scheme. While process block 1106 is shown to proceed directly after an external interrupt is trigged in process block 1104, in some embodiments, the external interrupt is delayed by a period of time before the control scheme is stopped. For example, a 30-second delay may be activated and then the control scheme is stopped.

At process block 1108, the thermostat determines if the external interrupt is still present. If the thermostat determines the external interrupt is still present, then process block 1108 can repeat. If the thermostat determines the external interrupt is no longer present, then at process block 1112 the control device 214 can resume the control scheme and therefore resume controlling the environment of the space. At process block 1114 the external interrupt logic returns.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A heating, ventilation, or air conditioning (HVAC) system in a building, the HVAC system comprising:
 building equipment operable to affect a space in the building;
 a controller coupled to the building equipment via a system bus, the controller comprising a processing circuit comprising one or more memory devices coupled to one or more processors, the one or more memory devices configured to store instructions thereon that, when executed by the one or more processors, cause the one or more processors to:
 receive an input signal via a binary input of the controller, the input signal based on one or more conditions of the space or the building equipment;
 generate a control signal to provide via an output of the controller to control the building equipment;
 determine the input signal is an interrupt signal based on a configuration of the binary input; and
 deactivate, in response to the interrupt signal, the output.

2. The HVAC system of claim 1, wherein the controller is a thermostat positioned in the space.

3. The HVAC system of claim 1, wherein the controller is communicably coupled to a building management system (BMS) for the building, and the controller receives the input signal via the BMS.

4. The HVAC system of claim 1, wherein the one or more memory devices are further configured to store instructions thereon that, when executed by the one or more processors, cause the one or more processors to:
 receive an additional input signal indicating one of a condition of the space or a condition of the building equipment; and
 generate the control signal based on the additional input signal regardless of whether output is in a deactivated state.

5. The HVAC system of claim 1, further comprising a mechanical switch configured to provide the input signal to the binary input.

6. The HVAC system of claim 5, wherein the mechanical switch is a temperature-controlled relay.

7. The HVAC system of claim 1, the one or more memory devices are further configured to store instructions thereon that, when executed by the one or more processors, cause the one or more processors to:
 deactivate the output so long as the controller determines the input signal is the interrupt signal up to a maximum time period; and
 reactivate the output at an expiration of the maximum time period.

8. The HVAC system of claim 7, wherein the one or more memory devices are further configured to store instructions thereon that, when executed by the one or more processors, cause the one or more processors to determine the maximum time period based on a user input.

9. The HVAC system of claim 1, wherein the one or more memory devices are further configured to store instructions thereon that, when executed by the one or more processors, cause the one or more processors to configure an additional binary input to receive an additional input signal.

10. The HVAC system of claim 1, the one or more memory devices are further configured to store instructions thereon that, when executed by the one or more processors, cause the one or more processors to alert a supervisory device in a building management system coupled to the controller when the output is determined to be in an activated state.

11. A method for operating a heating, ventilation, or air conditioning (HVAC) system in a building, the method comprising:
providing a controller comprising a processing circuit comprising one or more memory devices coupled to one or more processors, the one or more memory devices configured to store instructions thereon that, when executed by the one or more processors, cause the one or more processors to:
receive an input signal via a binary input of the controller, the input signal based on one or more conditions of a space in the building or building equipment operable to affect the space;
generate a control signal to provide via an output of the controller to control the building equipment;
determine the input signal is an interrupt signal based on a configuration of the binary input; and
deactivate, in response to the interrupt signal, the output.

12. The method of claim 11, wherein the controller is a thermostat positioned in the space.

13. The method of claim 11, wherein the controller is communicably coupled to a building management system (BMS) and the one or more memory devices are further configured to store instructions thereon that, when executed by the one or more processors, cause the one or more processors to receive the input signal via the BMS.

14. The method of claim 11, the one or more memory devices are further configured to store instructions thereon that, when executed by the one or more processors, cause the one or more processors to:
receive an additional input signal indicating one of a condition of the space or a condition of the building equipment; and
generate the control signal based on the additional input signal regardless of whether the output is deactivated.

15. The method of claim 11, wherein the input signal is provided by a mechanical switch.

16. The method of claim 15, wherein the mechanical switch is a temperature-controlled relay.

17. The method of claim 11, the one or more memory devices are further configured to store instructions thereon that, when executed by the one or more processors, cause the one or more processors to:
deactivate the output so long as the controller determines the input signal is the interrupt signal up to a maximum time period; and
reactivate the output at an expiration of the maximum time period.

18. The method of claim 17, the one or more memory devices are further configured to store instructions thereon that, when executed by the one or more processors, cause the one or more processors to:
receive a user input; and
determine the maximum time period based on the user input.

19. The method of claim 11, wherein the one or more memory devices are further configured to store instructions thereon that, when executed by the one or more processors, cause the one or more processors to configure an additional binary input to receive an additional interrupt signal.

20. The method of claim 11, the one or more memory devices are further configured to store instructions thereon that, when executed by the one or more processors, cause the one or more processors to alert a supervisory device in a building management system coupled to the controller when the output is determined to be in an activated state.

* * * * *